United States Patent
Ball et al.

(10) Patent No.: US 9,280,313 B2
(45) Date of Patent: Mar. 8, 2016

(54) AUTOMATICALLY EXPANDING SETS OF AUDIO SAMPLES

(71) Applicant: Microsoft Technology Licensing, LLC, Redmond, WA (US)

(72) Inventors: Steven J. Ball, Seattle, WA (US); Jorge Gabuardi Gonzalez, Seattle, WA (US); Tyler Brewer, Iowa City, IA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 14/032,150

(22) Filed: Sep. 19, 2013

(65) Prior Publication Data

US 2015/0081065 A1     Mar. 19, 2015

(51) Int. Cl.
   *G10H 7/00*     (2006.01)
   *G06F 3/16*     (2006.01)
   *G10H 1/00*     (2006.01)

(52) U.S. Cl.
   CPC ............... *G06F 3/16* (2013.01); *G10H 1/0025* (2013.01); *G10H 2210/066* (2013.01); *G10H 2210/071* (2013.01); *G10H 2210/076* (2013.01); *G10H 2210/081* (2013.01); *G10H 2210/125* (2013.01); *G10H 2210/141* (2013.01)

(58) Field of Classification Search
   CPC .......... G10H 1/0025; G10H 2210/066; G10H 2240/145; G10H 2210/076; G10H 2240/131; G10H 2240/075; G10H 2210/371; G10H 2240/141; G10H 2240/081; G10H 2210/071; G10H 2210/031; G10H 2210/325; G10H 2210/331; G10H 2210/341; G10H 2210/361
   See application file for complete search history.

(56) References Cited

U.S. PATENT DOCUMENTS

| 5,231,671 A | 7/1993 | Gibson et al. |
| 6,066,792 A | 5/2000 | Sone |

(Continued)

FOREIGN PATENT DOCUMENTS

| EP | 1959429 A1 | 8/2008 |
| WO | WO-2009022084 | 2/2009 |
| WO | WO-2009032794 | 3/2009 |

OTHER PUBLICATIONS

"Beyond Beatmatching: How to Use Harmonic Mixing (How to DJ)", Retrieved from the Internet: <<https://web.archive.org/web/20120712011901/http://www.mixedinky.com/Book/How-To-Use-Harmonic-Mixing>> on Aug. 12, 2014, 4 pages.

(Continued)

*Primary Examiner* — Marlon Fletcher
(74) *Attorney, Agent, or Firm* — Jeremy Snodgrass; Judy Yee; Micky Minhas

(57) ABSTRACT

A target set of one or more audio samples is automatically expanded to include one or more additional audio samples or sets of audio samples. Multiple different audio samples or sets of samples that have a high compatibility rating with the target set are identified. The high compatibility rating is based on rhythmic compatibility with the target set, harmonic compatibility with the target set, and/or compatibility with various other characteristics or parameters of the target set. One or more of the audio samples or sets of audio samples having a high compatibility rating with the target set are automatically added to the target set. Thus, the user is able to have a set of audio samples automatically added to a particular target set of audio samples, resulting in an expanded set of audio samples that sound coherent (e.g., rhythmically and harmonically compatible).

20 Claims, 15 Drawing Sheets

(56) References Cited

U.S. PATENT DOCUMENTS

| | | | |
|---|---|---|---|
| 6,103,964 A * | 8/2000 | Kay | 84/611 |
| 6,124,543 A * | 9/2000 | Aoki | 84/609 |
| 7,220,911 B2 | 5/2007 | Basu | |
| 7,667,126 B2 | 2/2010 | Shi | |
| 7,842,874 B2 | 11/2010 | Jehan | |
| 8,168,877 B1 | 5/2012 | Rutledge et al. | |
| 8,338,686 B2 | 12/2012 | Mann et al. | |
| 8,426,715 B2 | 4/2013 | Bregar et al. | |
| 2005/0240396 A1 | 10/2005 | Childs et al. | |
| 2007/0107585 A1 | 5/2007 | Leahy et al. | |
| 2007/0137463 A1 | 6/2007 | Lumsden | |
| 2007/0193435 A1 | 8/2007 | Hardesty et al. | |
| 2007/0213981 A1 | 9/2007 | Meyerhoff et al. | |
| 2007/0291958 A1* | 12/2007 | Jehan | 381/103 |
| 2008/0188967 A1* | 8/2008 | Taub et al. | 700/94 |
| 2008/0190271 A1* | 8/2008 | Taub et al. | 84/645 |
| 2008/0215340 A1 | 9/2008 | Su et al. | |
| 2008/0300702 A1 | 12/2008 | Gomez et al. | |
| 2009/0019995 A1* | 1/2009 | Miyajima | 84/625 |
| 2009/0214050 A1 | 8/2009 | Sawashi | |
| 2009/0299736 A1 | 12/2009 | Sato | |
| 2010/0186579 A1 | 7/2010 | Schnitman | |
| 2010/0199833 A1 | 8/2010 | McNaboe | |
| 2010/0293455 A1 | 11/2010 | Bloch | |
| 2010/0305732 A1 | 12/2010 | Serletic | |
| 2011/0268279 A1 | 11/2011 | Ishikawa et al. | |
| 2012/0118127 A1 | 5/2012 | Miyajima | |
| 2012/0132056 A1 | 5/2012 | Wang et al. | |
| 2012/0312145 A1 | 12/2012 | Kellett et al. | |
| 2015/0078583 A1 | 3/2015 | Ball et al. | |
| 2015/0081064 A1 | 3/2015 | Ball et al. | |
| 2015/0081613 A1 | 3/2015 | Ball et al. | |

OTHER PUBLICATIONS

"DJ Demonstration Pitch bend on pioneer CDJ-1000", retrieved from the Internet: <<https://www.youtube.com/watch?v=7d9BlaBD5XE>> on Aug. 12, 2014, 1 page.

"From Human Jukebox to DJ Artist", Camelot Sound—Retrieved from the Internet: <<https://web.archive.org/web/20121117184120/http://www.camelotsound.com/History.aspx spx>> on Aug. 12, 2014, 4 pages.

"How to: Understanding key and tempo in Harmonic Mixing", Discussion in "General DJ Discussion" started by djyakov, Jan. 31, 2007 Retrieved from the Internet: <<http://www.djtechtools.com/2010/03/23/ to-key-or-not-to-key/>> on 081/2/2014, 8 pages.

"International Search Report and Written Opinion", Application No. PCT/US2014/055973, Dec. 4, 2014, 11 pages.

"International Search Report and Written Opinion", Application No. PCT/US2014/055974, Dec. 19, 2014, 11 pages.

"International Search Report and Written Opinion", Application No. PCT/US2014/055971, Dec. 23, 2014, 11 pages.

"MixMeister Studio", Retrieved from the internet at: <<https://web.archive.org/web/20121014190638/http://www.mixmeister.com/products-mmstu7.php>>, Sep. 7, 2013, 2 pages.

"Rapid Evolution—Wikipedia, the free encyclopedia", Retrieved from the Internet: <<http://en.wikipedia.org/w/index.php?title=Rapid_Evolution&oldid=558815293>> on Aug. 12, 2014, 2 pages.

"To Key or Not to Key", DJ Tech Tools—Retrieved from the Internet: <<http://www.djtechtools.com/2010/03/23/to-key-or-not-to-key>> on Aug. 12, 2014, 6 pages.

Six, et al., "A Robust Audio Fingerprinter Based on Pitch Class Histograms Applications for Ethnic Music Archives", Jan. 20, 2012, 7 pages.

White, "Mixing in Key: When and How to Change Track Key in DJ Software", May 15, 2013, 5 pages.

Janer, et al., "Sound Object Classification for Symbolic Audio Mosaicing: A Proof-of-Concept", In Proceedings of the Conference of Sound and Music Computing, Jul. 23, 2009, pp. 297-302.

Schwarz, Diemo, "The Caterpillar System for Data-Driven Concatenative Sound Synthesis", In Proceedings of the 6th international Conference on Digital Audio Effects, Sep. 8, 2003, pp. 135-140.

"International Search Report & Written Opinion Issued in PCT Application No. PCT/US2014/055972", Mailed Date: Feb. 5, 2015, 10 Pages.

"Mixed in Key, Harmonizing Music", Retrieved from: <http://djorbit.blogspot.in/2010/06/mixed-in-key-harmonizing-music.html> on Aug. 23, 2013, (Jun. 24, 2010), 2 pages.

"Pitch Shifting and Multi-Voice Harmonizing Plug-In", Retrieved from: <http://www.sonicstate.com/news/2010/05/12/pitch-shifting-and-multi-voice-harmonizing-plug-in/> on Aug. 23, 2013, (May 12, 2010), 3 pages.

"Propellerhead Polar: Old School Harmonizing and Pitch-Shifter Effect Rack Extension for Reason", Retrieved from: <http://rekkerd.org/propellerhead-polar-old-school-harmonizing-and-pitch-shifter-effect-rack-extension-for-reason/> on Aug. 23, 2013, (Jun. 12, 2012), 3 pages.

"VirSyn Intros Harmony Voice Harmonizer + Pitch Shifter", Retrieved from: <http://www.synthtopia.com/content/2012/09/24/virsyn-intros-harmony-voice-harmonizer-pitch-shifter/> on Aug. 23, 2013, (Sep. 24, 2012), 4 pages.

Aeken, Francis V., "Jackson: DJ Software Powered by Musical Metadata", In Software BVBA, Retrieved from <http://vanaeken.com/JacksonCameraReady.pdf>,(Aug. 2001), 5 pages.

CAL, "A Complete Guide to Harmonic Mixing—How to Make a DJ Mix or Mashup Like a Professional", Retrieved from: <http://salacioussound.com/2010/10/a-complete-guide-to-harmonic-mixing-%E2%80%93-how-to-make-a-dj-mix-or-mashup-like-a-professional/> on Aug. 27, 2013, (Oct. 10, 2010), 9 pages.

Gill, Chris "DigiTech HarmonyMan Intelligent Pitch Shifter", Retrieved from: <http://www.guitarworld.com/digitech-harmony-man-intelligent-pitch-shifter> on Aug. 23, 2013, (Aug. 4, 2009), 4 pages.

Gonzalez, et al., "Automatic Mixing Tools for Audio and Music Production", Retrieved from <http://c4dm.eecs.qmul.ac.uk/audioengineering/automaticmixing/> on Jul. 16, 2013, 3 pages.

Griffin, et al., "Beat-Sync-Mash-Coder: A Web Application for Real-Time Creation of Beat-Synchronous Music Mashups", In IEEE International Conference on Acoustics Speech and Signal Processing, Retrieved from <http://web.cs.swarthmore.edu/~turnbull/Papers/Griffin_BSMC_ICASSP10.pdf>,(Mar. 14, 2010), 4 pages.

Hawkins, Jordan V., "Automating Music Production with Music Information Retrieval", A Thesis Submitted for Partial Fulfillment of Requirements for Graduation with Research Distinction in the Department of Computer Science and Engineering of the Ohio State University, Retrieved from <https://kb.osu.edu/dspace/bitstream/handle/1811/54438/Jordan_Hawkins_Senior_Thesis.pdf?sequence=1>,(Mar. 2013), 66 pages.

Jehan, Tristan "Creating Music by Listening", In PhD Thesis of Massachusetts Institute of Technology, Retrieved from <http://web.media.mit.edu/~tristan/Papers/PhD_Tristan.pdf>,(Sep. 2005), 137 pages.

Lagrange, Mathieu al., "Adaptive Harmonization and Pitch Correction of Polyphonic Audio Using Spectral Clustering", In Proceedings of DAFx 2007, (Sep. 2007), pp. 1-4.

Mims, Christopher "Auto-Mash-up Your Favorite Tracks", Retrieved from <http://www.technologyreview.com/view/419015/auto-mash-up-your-favorite-tracks/>, (May 20, 2010), 3 pages.

Rogerson, Ben "New Mashup Software Matches Songs Automatically", Retrieved from: <http://www.musicradar.com/news/tech/new-mashup-software-matches-songs-automatically-529066> on Aug. 27, 2013, (Feb. 10, 2012), 4 pages.

"Non-Final Office Action", U.S. Appl. No. 14/032,154, Jun. 11, 2015, 4 pages.

"International Preliminary Report on Patentability", Application No. PCT/US2014/055972, Sep. 9, 2015, 6 pages.

"International Preliminary Report on Patentability", Application No. PCT/US2014/055974, Sep. 11, 2015, 6 pages.

"Notice of Allowance", U.S. Appl. No. 14/032,154, Sep. 10, 2015, 4 pages.

* cited by examiner

302 ⟶ Sample 1

| Note | Amount Of Pitch Present |
|---|---|
| A | 0.07 |
| A# | 0.12 |
| B | 0.04 |
| C | 0.12 |
| C# | 0.04 |
| D | 0.14 |
| D# | 0.08 |
| E | 0.03 |
| F | 0.07 |
| F# | 0.06 |
| G | 0.16 |
| G# | 0.07 |

Sample 2 ⟵ 304

| Note | Amount Of Pitch Present |
|---|---|
| A | 0.09 |
| A# | 0.06 |
| B | 0.17 |
| C | 0.05 |
| C# | 0.09 |
| D | 0.04 |
| D# | 0.09 |
| E | 0.13 |
| F | 0.05 |
| F# | 0.09 |
| G | 0.04 |
| G# | 0.10 |

Fig. 3

Sample 2 Shifted One Semitone ⟋402

| Note | Amount Of Pitch Present |
|---|---|
| A | 0.10 |
| A# | 0.09 |
| B | 0.06 |
| C | 0.17 |
| C# | 0.05 |
| D | 0.09 |
| D# | 0.04 |
| E | 0.09 |
| F | 0.13 |
| F# | 0.05 |
| G | 0.09 |
| G# | 0.04 |

Sample 2 Shifted Two Semitones ⟋404

| Note | Amount Of Pitch Present |
|---|---|
| A | 0.04 |
| A# | 0.10 |
| B | 0.09 |
| C | 0.06 |
| C# | 0.17 |
| D | 0.05 |
| D# | 0.09 |
| E | 0.04 |
| F | 0.09 |
| F# | 0.13 |
| G | 0.05 |
| G# | 0.09 |

Fig. 4

Pitch Shift
Correlation

502 →

| Shift Amount | Correlation |
|---|---|
| 0 | 0.0689 |
| +1 | 0.0904 |
| +2 | 0.0762 |
| +3 | 0.0822 |
| +4 | 0.0698 |
| +5 | 0.0537 |
| +6 | 0.0640 |
| +7 | 0.0587 |
| +8 | 0.0825 |
| +9 | 0.0812 |
| +10 | 0.0822 |
| +11 | 0.0945 |

602

| Pitch Shift | Weight |
|---|---|
| 0 | 1.0 |
| 1 | 1.0 |
| 2 | 1.0 |
| 3 | 0.98 |
| 4 | 0.98 |
| 5 | 0.97 |
| 6 | 0.97 |
| 7 | 0.97 |
| 8 | 0.98 |
| 9 | 0.98 |
| 10 | 1.0 |
| 11 | 1.0 |

Pitch Shift Combinations ⟋ 702

| | |
|---|---|
| 0 | 0 |
| +1 | -11 |
| +2 | -10 |
| +3 | -9 |
| +4 | -8 |
| +5 | -7 |
| +6 | -6 |
| +7 | -5 |
| +8 | -4 |
| +9 | -3 |
| +10 | -2 |
| +11 | -1 |

| Pitch Shift | Weight |
|---|---|
| 0 | 1.00 |
| 1 | 0.94 |
| 2 | 0.89 |
| 3 | 0.81 |
| 4 | 0.74 |
| 5 | 0.71 |
| 6 | 0.65 |
| 7 | 0.78 |
| 8 | 0.80 |
| 9 | 0.86 |
| 10 | 0.93 |
| 11 | 0.98 |

Fig. 10

| Tempo Value | Points |
|---|---|
| Within 0.5% | 3 |
| Greater Than 0.5% But Less Than 10% | 2 |
| Greater Than Or Equal To 10% But Less Than 20% | 1 |
| Greater Than Or Equal To 20% But Less Than 25% | 0 |
| Greater Than Or Equal To 25% But Less Than 30% | -1 |
| Greater Than Or Equal To 30% But Less Than 35% | -2 |
| Greater Than Or Equal To 35% | -3 |

Fig. 9

| Pitch Compatibility Rating | Points |
|---|---|
| At Least 0.90 | 7 |
| Less Than Or Equal To 0.90 But Greater Than 0.87 | 6 |
| Less Than Or Equal To 0.87 But Greater Than 0.84 | 5 |
| Less Than Or Equal To 0.84 But Greater Than 0.81 | 4 |
| Less Than Or Equal To 0.81 But Greater Than 0.78 | 3 |
| Less Than Or Equal To 0.78 But Greater Than 0.75 | 2 |
| Less Than Or Equal To 0.75 But Greater Than 0.72 | 1 |
| Less Than Or Equal To 0.72 | 0 |

1102

Fig. 11

AUTOMATICALLY EXPANDING SETS OF AUDIO SAMPLES

BACKGROUND

As computing technology has advanced, the uses people have found for computers has expanded. One such use is music, with various software programs allowing for the authoring and playback of music. Although these programs are useful, they are not without their problems. One such problem is that these software programs typically provide a great deal of control over various aspects of the music, allowing the user to independently adjust numerous different aspects of the music. This control, however, requires specialized knowledge on the part of the user regarding how music is composed, which can lead to frustrating user experiences for users without such specialized musical knowledge.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an indication of a target set of audio samples to be expanded is obtained. One audio sample of multiple audio samples having a high compatibility rating with the target set is identified, the high compatibility rating having been determined based on rhythmic compatibility of the one audio sample and the target set as well as harmonic compatibility of the one audio sample and the target set. The identified audio sample is automatically added to the target set of audio samples.

In accordance with one or more aspects, a computing device includes a recommendation module and an audio combining module. The recommendation module is configured to generate a compatibility rating for each of multiple groupings of audio samples, the compatibility rating of a grouping being based on rhythmic compatibility of the grouping and a target set of audio samples as well as harmonic compatibility of the grouping and the target set of audio samples. The audio combining module is configured to automatically add to the target set of audio samples one of the multiple groupings having a high compatibility rating.

BRIEF DESCRIPTION OF THE DRAWINGS

The same numbers are used throughout the drawings to reference like features.

FIG. 3 illustrates example pitch distributions of two different example audio samples.

FIG. 4 illustrates example shifted versions of pitch distributions.

FIG. 5 illustrates an example table of pitch shift correlations for two example audio samples.

FIG. 6 illustrates an example table of pitch shifts and corresponding weights in accordance with one or more embodiments.

FIG. 7 illustrates an example table of pitch shift combinations, showing the relative positive and negative shift combinations.

FIG. 9 illustrates an example table of scores assigned to samples based on how close their tempos are to one another in accordance with one or more embodiments.

FIG. 10 illustrates an example table of pitch shifts and corresponding weights in accordance with one or more embodiments.

FIG. 11 illustrates an example table of scores assigned to samples based on their pitch compatibility ratings in accordance with one or more embodiments.

DETAILED DESCRIPTION

Automatically expanding sets of audio samples is discussed herein. A target set of one or more audio samples is automatically expanded to include one or more additional audio samples or sets of audio samples. Multiple different audio samples or sets of samples that have a high compatibility rating with the target set are identified. The high compatibility rating is based on rhythmic compatibility with the target set, harmonic compatibility with the target set, and/or compatibility with various other characteristics or parameters of the target set. One or more of the audio samples or sets of audio samples having a high compatibility rating with the target set are automatically added to the target set. Thus, the user is able to have a set of audio samples automatically added to a particular target set of audio samples, resulting in an expanded set of audio samples that sound coherent (e.g., rhythmically and harmonically compatible).

Figure 1:
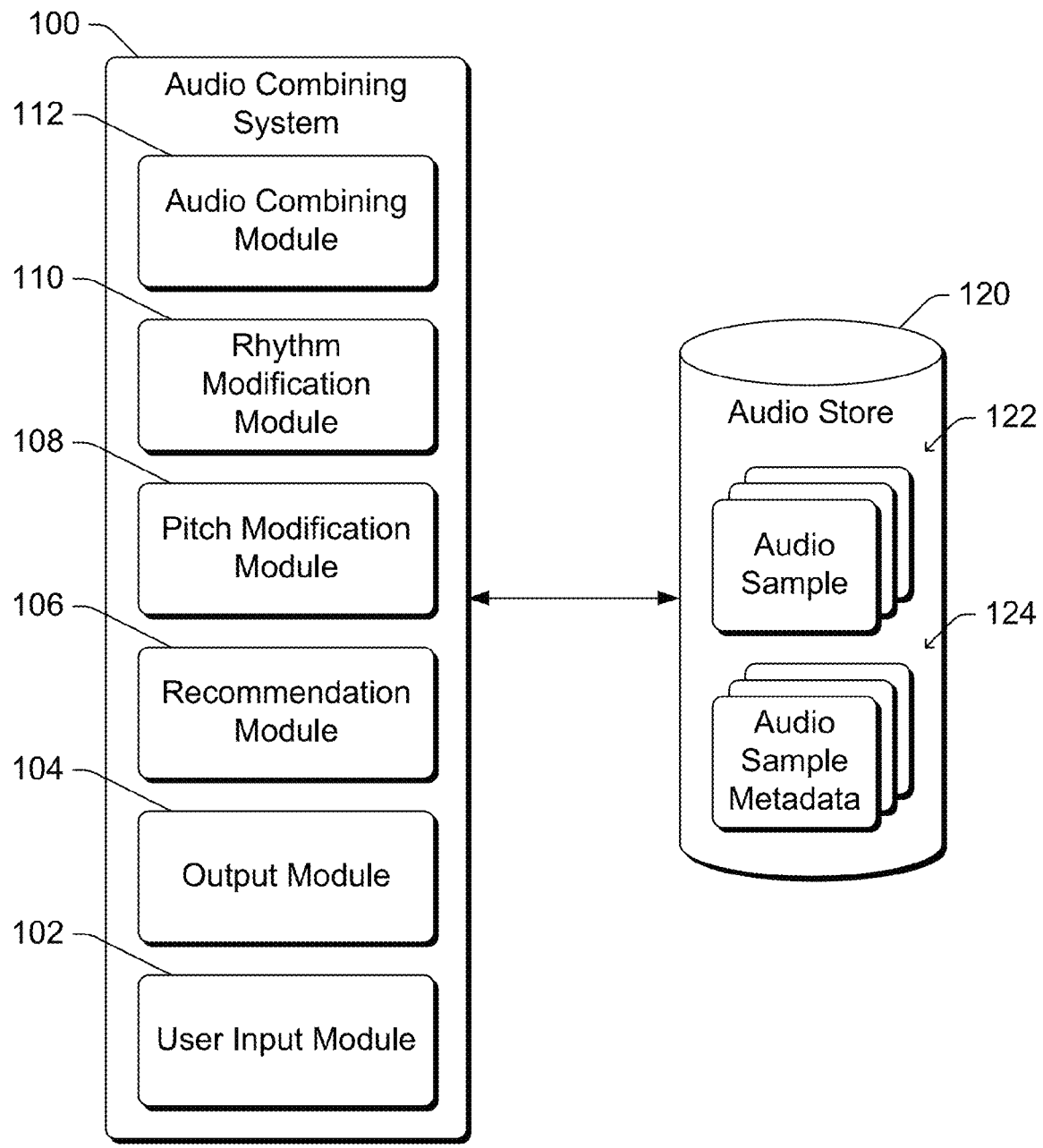
FIG. 1 is a block diagram illustrating an example audio combining system implementing the automatically expanding sets of audio samples in accordance with one or more embodiments.

FIG. 1 is a block diagram illustrating an example audio combining system 100 implementing the automatically expanding sets of audio samples automatically adjusting sample characteristics in accordance with one or more embodiments. The audio combining system 100 can be implemented using a variety of different types of devices, such as a physical device or a virtual device. For example, the system 100 can be implemented using a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, any other general purpose computing device, and so forth. The system 100 can also be implemented using a virtual device, such as a virtual machine running on a physical device. A virtual machine can be run on any of a variety of different types of physical devices (e.g., any of the various types listed above). Thus, the system 100 can be implemented using one or more of a variety of different devices ranging from full resource devices with substantial memory and processor resources (e.g., personal computers, game consoles) to low-resource devices with limited memory and/or processing resources (e.g., traditional set-top boxes, hand-held game consoles).

The audio combining system 100 includes a user input module 102, an output module 104, a recommendation module 106, a pitch modification module 108, a rhythm modification module 110, and an audio combining module 112. The audio combining system 100 obtains audio samples and metadata for those audio samples from an audio store 120. The audio store 120 can be implemented by the same device as implements at least part of the audio combining system 100, or alternatively can be implemented by one or more other devices.

The audio store 120 includes multiple audio samples 122. Each sample 122 includes audio data for one or more sounds. The audio store 120 can include previously recorded samples, live samples (e.g., audio being presented at approximately the same time as (e.g., within a threshold amount of time of) the sample is being stored in the audio store 120), samples that are the result of previously combined samples (as discussed in more detail below), and so forth. When the audio data for the one or more sounds in a sample 122 is played back by a device, the device plays those one or more sounds.

Multiple samples 122 can optionally be grouped together into a set of samples. A set of samples can include the audio data for one or more of the multiple samples in the set, and/or an indication of (e.g., file name or other identifier of) the samples that are included in the set.

Each of the one or more sounds in a sample can have various characteristics (also referred to as parameters), such as rhythm, pitch, and so forth as discussed in more detail below. The audio store 120 also includes sound metadata 124. Each audio sample 122 has corresponding audio sample metadata 124 that identifies at least some of the parameters of the sample 122. Each set of samples also has corresponding audio sample metadata 124 that identifies at least some of the parameters of the set of samples. The parameters of the set of samples refer to an aggregate (e.g., a concatenation of, an average of, etc.) the metadata corresponding to each sample in the set. The sample metadata 124 corresponding to a sample 122 or set of samples can be stored in various manners, such as being stored as part of the same data structure or file as the corresponding sample 122 or set of samples, being stored in a separate database or other record, being stored in a remote cloud or server-based database, and so forth.

The user input module 102 receives user inputs from a user of the device implementing the system 100. User inputs can be provided in a variety of different manners, such as by pressing one or more keys of a keypad or keyboard of the device implementing the system 100, pressing one or more keys of a controller (e.g., remote control device, mouse, track pad, etc.) of the device implementing the system 100, pressing a particular portion of a touchpad or touchscreen of the device implementing the system 100, making a particular gesture on a touchpad or touchscreen of the device implementing the system 100, and/or making a particular gesture on a controller (e.g., remote control device, mouse, track pad, etc.) of the device implementing the system 100. User inputs can also be provided via other physical feedback input to the device implementing the system 100, such as tapping any portion of the device implementing the system 100, an action that can be recognized by a motion detection or other component of the device implementing the system 100 (such as shaking the device implementing the system 100, rotating the device implementing the system 100, bending or flexing the device implementing the system 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the system 100. This content can be, for example, a display or playback portion of a user interface (UI). The content can be displayed or otherwise played back by components of the device implementing the system 100 (e.g., speakers, interactive display devices, etc.). Alternatively, the output module 104 can generate one or more signals that are output to other devices or components (e.g., speakers, display devices, etc.) that are separate from the device implementing the system 100.

The recommendation module 106 analyzes the sample metadata 124 for different samples 122 and based on this analysis generates recommendations for combining different ones of the samples 122. These recommendations are indications of how good the module 106 determines that two of the samples 122 will sound together to a user. These indications can be rankings or other scores assigned to different ones of the samples 122 as discussed in more detail below.

The rhythm modification module 110 alters the rhythm of one or more of the samples 122. The rhythm of a sample 122 is altered by the module 110 to allow the sample 122 to sound better when combined with one or more other samples 122 (e.g., be more rhythmically coherent with one or more other samples 122). How to alter the rhythm of a sample 122 is determined based on the tempo of the sample 122 as well as the tempo of the one or more samples 122 with which the sample 122 is being combined or with which the sample 122 is contemplated as being combined as discussed in more detail below.

The pitch modification module 108 alters the pitch of one or more of the samples 122. The pitch of a sample 122 is altered by the module 108 to allow the sample 122 to sound better when combined with one or more other samples 122 (e.g., be more harmonically coherent with one or more other samples 122). How to alter the pitch of a sample 122 is determined based on the pitch distribution of the sample 122 as well as the pitch distribution of the one or more samples 122 with which the sample 122 is being combined or with which the sample 122 is contemplated as being combined as discussed in more detail below.

The audio combining module 112 combines different samples 122, optionally creating a new sample 122 or set of samples. The combining of different samples 122 can include adjusting the pitch of one or more of the samples 122 and/or adjusting the rhythm of one or more of the samples 122. This combining of different samples 122 is discussed in more detail below.

Although specific modules 102-112 are illustrated as being included in the audio combining system 100, it should be noted that the system 100 need not include all of the modules 102-112. For example, if system 100 automatically combines audio samples without generating recommendations for combining different ones of the samples, then the system 100 need not include recommendation module 106.

Sample Metadata

Each sample 122 has corresponding sample metadata 124. The metadata 124 corresponding to a sample 122 describes various characteristics or parameters of the sample 122. The metadata 124 corresponding to a sample 122 is data describing one or more aspects of the one or more sounds in the sample 122. Various examples of sample metadata 124 are discussed herein, and it should be noted that various different sample metadata can be used by the audio combining system 100. The sample metadata used by the audio combining system 100 can include various combinations of the examples included herein and/or additional metadata.

The metadata 124 corresponding to a sample 122 can be generated in a variety of different manners. In one or more embodiments, the metadata 124 corresponding to a sample 122 is generated manually, being assigned by one or more people (which may be, but need not be, a user of the audio combining system 100). Alternatively, the metadata 124 corresponding to a sample 122 can be generated automatically by analyzing the sample 122 using any of a variety of public and/or proprietary techniques. It should be noted that metadata 124 corresponding to a sample 122 can optionally be overridden by a user of the audio combining system 100. For example, a characteristic or parameter of a sample 122 can be the sample type of the sample 122 (e.g., stem or oneshot) as discussed below, and this characteristic or parameter can be initially set (e.g., automatically or by another person) and overridden by a user of the audio combining system 100.

One characteristic or parameter of the sample 122 that can be included in the corresponding sample metadata 124 is the harmonic content of the sample 122. In one or more embodiments, the harmonic content of a sample refers to the key center and/or notes used in the sample. The key center refers to the average diatonic key of the notes used in the sample. For example, the average diatonic key can be the key a musician would assign as (or use to generally label the sample as) the likely key center of the sound in the sample. The average key may be, for example, G, C major, B minor, and so forth. The average key may also be null, such as for a sample made up of an un-pitched drum roll or a human clapping sound. For a set of samples, the key center refers to the average key of the notes used in the samples in the set.

The notes used in the sample refers to the notes that are included in the sample, regardless of how often those notes are used and/or the octave of the notes. The notes use in the sample may be, for example, D, E, F# (F sharp), and B. The metadata corresponding to the sample can include per-note metadata for the sample, identifying various characteristics or parameters of the notes used in the sample. Alternatively, the notes used in the sample may include the note as well as the octave (above or below) of the note. The notes used may also be null, such as for a sample made up of an un-pitched drum roll. For a set of samples, the notes used in the set refers to the notes that are included in the samples in the set (e.g., each note that is included in at least one sample of the set but need not be included in each sample in the set).

Another characteristic or parameter of the sample 122 that can be included in the corresponding sample metadata 124 is the rhythmic content of the sample 122. In one or more embodiments, the rhythmic content of a sample refers to the average number of beats per minute of the sample (also referred to as the tempo of the sample). For example, the rhythmic content can be the average number of beats per minute of the primary pulse of music in the sample or of the lowest common repeating rhythm of music in the sample. It should be noted that the average number of beats per minute of the sample is independent of the time signature or rhythmic nuances and syncopations within the sample. A sample having a single rhythmic element is referred to as having an average number of beats per minute of 0 (zero). For a set of samples, the rhythmic content of the set can refer to the average number of beats per minute of the samples in the set. Alternatively, the rhythmic content can be different information, such as a list of the various beats per minute used throughout the sample (e.g., and from which an average number of beats per minute of the sample is or can be calculated).

Additionally or alternatively, the rhythmic content of a sample can also refer to the time signature(s) of the sample. The time signature(s) of the sample can also be referred to as the phrased rhythmic content of the sample. The time signature generally refers to the number of pulses that define the rhythmic relationships within the structure of the sample, defining the common length(s) of rhythmic units of the sample. The sample can include one or more different time signatures. For a set of samples, the rhythmic content of the set can refer to the time signature(s) of the samples in the set (e.g., each time signature that is included in at least one sample of the set but need not be included in each sample in the set).

Additionally or alternatively, the rhythmic content of a sample or set of samples can also refer to the rhythmic coherence or "feel" of the sample or set of samples. The rhythmic coherence of a sample or set of samples refers to a type or style of music in the sample or set of samples, such as a swing type of music, a metronomic band type of music, and so forth. The 'feel' of a sample can also be quantified by describing the location of the notes played relative to a steady, metronomic pulse. For example, some musicians play notes late and the feel is "laid back", while some musicians play notes just ahead of a metronomic pulse and these may be described as a "driving" feel. The "feel" of a sample or section of music can be quantified by describing the exact note positions across a timeline relative to a steady metronomic pulse.

Another characteristic or parameter of the sample 122 that can be included in the corresponding sample metadata 124 is the instrumentation of the sample 122. In one or more embodiments, the instrumentation of a sample refers to a description of the instruments that the sounds in the sample represent. The instrumentation of the sample 122 describes a list of parameters designed to indicate the musical palette or 'color' of the sounds in the sample. For example, the instrumentation of the sample 122 may be piano, drums, guitar, violin, synthesizer, combinations thereof, and so forth. For a set of samples, the instrumentation of the set refers to a description of the instruments that the sounds in the samples in the set represent (e.g., each instrument that the sound in at least one sample of the set represents, but each instrument need not be represented by the sound in each sample in the set).

Another characteristic or parameter of the sample 122 that can be included in the corresponding sample metadata 124 is the genre of the sample 122 or set of samples. In one or more embodiments, the genre of a sample or set of samples refers to a description of the cultural meaning of the sounds (e.g., music) in the sample or set of samples. For example, the genre of a sample or set of samples can be electronic dance music, indie pop, smooth jazz, and so forth.

Another characteristic or parameter of the sample 122 that can be included in the corresponding sample metadata 124 is the sample type of the sample 122. In one or more embodiments, the sample type of a sample is either a stem or a oneshot. A stem refers to a sound that has a rhythm, and is typically a long phrase that generally includes multiple notes, a rhythm, and something that unfolds over time. A oneshot refers to a sound that does not have a rhythm, and is typically a short sound (shorter in duration than a stem) that makes a meaningful component of a longer phrase (e.g., of a stem). For example, a stem can be a sample made up of one or more notes forming a melody or rhythmic element, a sample containing an entire soloed lead vocal line for a whole song, a sample containing a drum sub-mix from an entire song, a sample containing a 4-bar drum loop, and so forth. By way of another example, a oneshot can be a single note from a single instrument, a single chord of notes from a single instrument, a single hybrid sound extracted from a full song containing many instruments, a sample designed to be played only once, and so forth. For a set of samples, the type of the set refers to the types of the samples in the set.

Another characteristic or parameter of the sample 122 that can be included in the corresponding sample metadata 124 is the "complementary value" of the sample 122. In one or more embodiments, the complementary value of the sample describes a feeling or cultural meaning of the music. For example, the complementary value of a sample may be the cultural root or basis of the audio in the sample (e.g., Indian, Chinese, German, etc.). For a set of samples, the complementary value of the set refers to the complementary values of the samples in the set (e.g., each complementary value that is included in at least one sample of the set but need not be included in each sample in the set).

Another characteristic or parameter of the sample 122 or set of samples that can be included in the corresponding sample metadata 124 is the mood of the sample 122 or set of samples. In one or more embodiments, the mood of a sample or set of samples refers to a description of the mood or feelings intended to be conveyed by the sounds (e.g., music) in the sample or set of samples. For example, the mood of a sample or set of samples can be sad, happy/upbeat, introspective, and so forth.

Pitch Modification

The pitch modification module 108 of FIG. 1 determines how to alter the pitch of a sample 122 to improve the harmonization of that sample 122 when combined with one or more other samples 122. In one or more embodiments, this determination is made based on pitch distributions of the samples, and is used to automatically alter the pitch of one or more of the samples 122.

Figure 2:
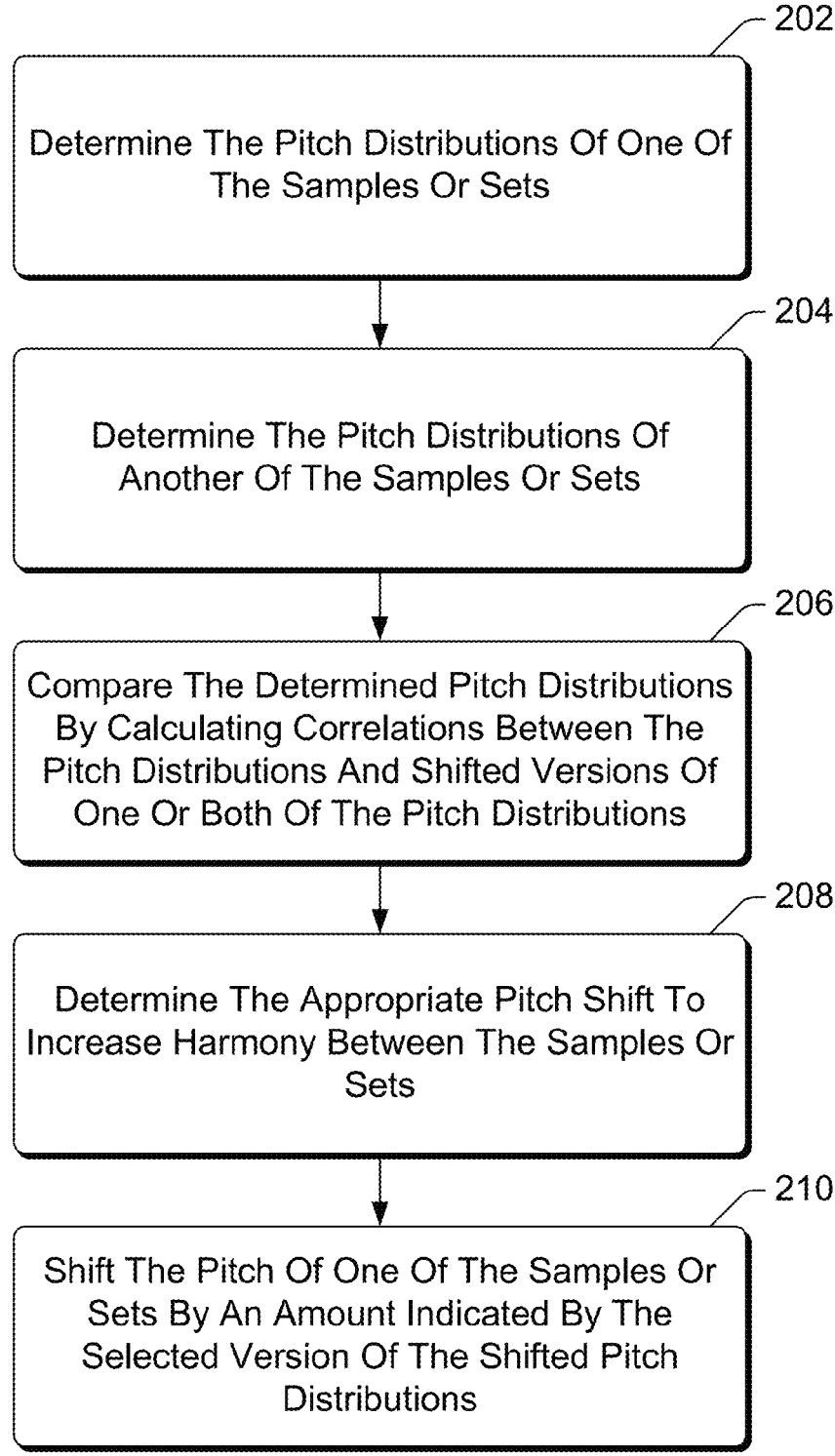
FIG. 2 is a flowchart illustrating an example process for automatically adjusting the pitch of one or more audio samples in accordance with one or more embodiments.

FIG. 2 is a flowchart illustrating an example process 200 for automatically adjusting the pitch of one or more samples in accordance with one or more embodiments. Process 200 is carried out by a pitch modification module, such as pitch modification module 108 of FIG. 1, and can be implemented in software, firmware, hardware, or combinations thereof. Process 200 is shown as a set of acts and is not limited to the order shown for performing the operations of the various acts. Process 200 is an example process for automatically adjusting the pitch of one or more samples; additional discussions of automatically adjusting the pitch of one or more samples are included herein with reference to different figures.

In process 200, the pitch distributions of one or more samples or sets of samples are determined (act 202). In one or more embodiments, the pitch distribution of a sample indicates how much of each pitch is present in the sample. The pitch distribution of a sample is determined by decomposing the sample into the set of frequencies in the sound waves generated by playing back the sample. Different pitches (also referred to as semitones or notes) are associated with different frequencies or frequency ranges, as is known to those skilled in the art. A sound can be one of twelve different possible pitches: A, A#, B, C, C#, D, D#, E F, F#, G, or G# (or enharmonic equivalents with flats). How much of each pitch is present in the sample is determined by how much of the sample when played back results in sound having a root frequency associated with the pitch (e.g., what percentage of the time of playback of the sample results in sound having a frequency associated with the pitch). This decomposition and determination of how much of each pitch is present in the sample can be performed using any of a variety of public and/or proprietary signal processing techniques. The pitch distribution can alternatively be represented in other manners, such as simply as the list of notes present (e.g., as detected by a human musician), and need not be dependent on computer or digital signal processing analysis. Despite the listing of percentages for each note in certain examples herein, the source of the pitch distribution data could be human entered metadata about each sample used. In situations in which the pitch distribution is the list of notes present, the pitch shifting and pitch correlations can be performed as discussed herein, although indications of absence or presence of a note (e.g., one value such as 0 for absence, and another value such as 1 for presence) can be used rather than percentages for each note.

In situations in which the pitch distributions for a set of samples are determined in act 202, the pitch distributions of the set of samples can be determined by determining the pitch distributions for each sample in the set of samples and then combining (e.g., averaging, adding and then normalizing to 1, etc.) the pitch distributions for each pitch in the set of samples. Alternatively, the pitch distributions for a set of samples can be determined in other manners. For example, the samples can be played back concurrently (or analyzed as if played back concurrently) and the pitch distributions for the set of samples determined as if the set of samples were a single sample.

The pitch distributions of another one or more samples or sets of samples are also determined (act 204). Thus, pitch distributions for two different samples (and/or sets of samples) are determined in acts 202 and 204. These two different samples (and/or sets of samples) are the samples (and/or sets of samples) that are being combined or are contemplated as being combined.

FIG. 3 illustrates example pitch distributions of two different example samples. A pitch distribution 302 for a Sample 1 is illustrated, indicating that 7% (e.g., shown as 0.07) of the sample is the pitch for the note A, 12% (e.g., shown as 0.12) of the sample is the pitch for the note A#, 4% (e.g., shown as 0.04) of the sample is the pitch for the note B, and so forth. A pitch distribution 304 for a Sample 2 is also illustrated, indicating that 9% (e.g., shown as 0.09) of the sample is the pitch for the note A, 6% (e.g., shown as 0.06) of the sample is the pitch for the note A#, 17% (e.g., shown as 0.17) of the sample is the pitch for the note B, and so forth. It should be noted that the pitch distribution for a sample identifies how much of each pitch is present in the sample without regard for which octave the particular note is in. For example, for Sample 1, 7% of the sample is the pitch for the note A, and that 7% can include pitches for the note A in one or more octaves.

Returning to FIG. 2, the pitch distributions determined in acts 202 and 204 are compared to one another by calculating the correlations between the determined pitch distributions and shifted versions of one or both of the determined pitch distributions (act 206). A shifted version of a pitch distribution refers to the values (e.g., the percentages) for the pitches being shifted up or down by one or more semitones. For example, the pitches can be shifted one semitone up, resulting in the percentage for the note A in the pitch distribution becoming what the percentage was for the note G# prior to the shifting, the percentage for the note A# in the pitch distribution becoming what the percentage was for the note A prior to the shifting, and so forth.

FIG. 4 illustrates example shifted versions of pitch distributions. A pitch distribution 402 is illustrated, with the pitches for Sample 2 of FIG. 3 being shifted one semitone up. A pitch distribution 404 is also illustrated, with the pitches for Sample 2 of FIG. 3 being shifted two semitones up.

Returning to FIG. 2, in act 206 the correlation between the pitch distributions determined in acts 202 and 204 as well as the shifted versions of the pitch distributions determined in acts 202 and 204 are calculated. The number of pitch shifts by one semitone that will yield a different pitch distribution is eleven, so the number of correlations calculated in act 206 is twelve—one for the original pitch distributions and one for each shifted pitch distribution. The values for the pitches in a pitch distribution can be viewed as a vector, and the correlation is the dot product of the pitch distribution vectors of the two samples. For example, the values for the pitches in the pitch distribution 302 of FIG. 3 can be viewed as a vector [0.07 0.12 0.04 0.12 0.04 0.14 0.08 0.03 0.07 0.06 0.16 0.07]. An alternative way to write this vector, as well as the example pitch distributions of FIG. 3, is using integer percentages, resulting in a vector of [7% 12% 4% 12% 4% 14% 8% 3% 7% 6% 16% 7%]. The pitch correlation is determined according to the following formula:

$$P(S1, S2) = D(S1) * D(S2) = \sum_{i=0}^{11} d_i * d_i' \quad (1)$$

where P(S1, S2) refers to the pitch correlation between the two samples, D(S1) is the pitch distribution of one of the two samples, D(S2) is the pitch distribution of the other of the two samples, $d_i$ is the value for the pitch i in the pitch distribution of one of the two samples, and $d_i'$ is the value for the pitch i in the pitch distribution of the other of the two samples.

The pitch correlation is calculated using formula (1) for the pitch distributions determined in acts 202 and 204 as well as for each of the shifted versions of the pitch distributions determined in acts 202 and 204. FIG. 5 illustrates an example table 502 of pitch shift correlations for Sample 1 and Sample 2 of FIG. 3. Table 502 illustrates that the pitch shift correlation for the pitch distributions for Sample 1 and Sample 2 without shifting is 0.0689, that the pitch shift correlation for the pitch distributions for Sample 1 unshifted and Sample 2 shifted one semitone up is 0.0904, and so forth.

Returning to FIG. 2, the appropriate pitch shift to increase harmony between the samples or sets determined in acts 202 and 204 is determined (act 208). In one or more embodiments, the appropriate pitch shift is the pitch shift that results in approximately the highest (e.g., the largest or within a threshold amount of the highest) pitch correlation. For example, referring to table 502 of FIG. 5, the appropriate pitch shift would be +11 semitones (having a pitch correlation of 0.0945). It should be noted that situations can arise in which the highest pitch correlation result from the samples without shifting, so the appropriate pitch shift determined in act 208 may be zero (no shift).

The determination of the appropriate pitch shift in act 208 optionally takes into consideration how much pitch modification is performed in order to obtain the appropriate shift. Preference is given to shifting the pitch by a smaller number of semitones. In one or more embodiments, the pitch correlations are weighted to generate weighted pitch correlations, with larger weights being used for selected pitch correlations obtained with less pitch modification and smaller weights being used for selected pitch correlations obtained with more pitch modification.

FIG. 6 illustrates an example table 602 of pitch shifts and corresponding weights in accordance with one or more embodiments. As illustrated in table 602, a pitch shift of 0 corresponds to a weight of 1.0, a pitch shift of 3 corresponds to a weight of 0.98, a pitch shift of 5 corresponds to a weight of 0.97, and so forth. Each pitch correlation is multiplied by the weight corresponding to the amount of shift (e.g., the number of semitones) the pitch was shifted to obtain the weighted pitch correlation. For example, the pitch correlation resulting from the pitch being shifted +3 semitones is multiplied by 0.98 to obtain the weighted pitch correlation. The appropriate pitch shift in act 208 of FIG. 2 is then the pitch shift that results in approximately the highest (e.g., the largest or within a threshold amount of the highest) weighted pitch correlation.

Returning to FIG. 2, the pitch of one of the samples or sets of samples is shifted by an amount indicated by the determined appropriate pitch shift as determined in act 208 (act 210). The sample or set of samples the pitch of which is shifted can be, but need not be, the sample or set of samples that was shifted in act 206 when comparing the determined pitch distributions. In one or more embodiments, one of the samples or sets of samples is shifted by the amount identified by the determined appropriate pitch shift as determined in act 208 (e.g., by +11 semitones using the example of table 502 of FIG. 5).

It should be noted that because the pitch distributions do not account for octaves of sounds, a negative shift rather than a positive shift may be performed. FIG. 7 illustrates an example table 702 of pitch shift combinations, showing the relative positive and negative shift combinations. Positive pitch shifts are illustrated on the left side of table 702 and the equivalent negative pitch shifts are illustrated on the right side of table 702. Thus, as illustrated in table 702, a pitch shift of +1 is equivalent to a pitch shift of −11, a pitch shift of +3 is equivalent to a pitch shift of −9, and so forth.

Returning to FIG. 2, in one or more embodiments the amount of shift in act 210 is the one of the positive pitch shift and the equivalent negative pitch shift having the smaller absolute value. By selecting the one of the positive and negative pitch shift having the smaller absolute value, the amount of shifting performed may be reduced, resulting in a shifted version of the sample that sounds closer to the original (unshifted) version of the sample. For example, if the appropriate pitch shift as determined in act 208 were to be +11, then in act 210 the amount of shift would be −1 (which is equivalent to +11 per table 702, and has a smaller absolute value). By way of another example, if the appropriate pitch shift as determined in act 208 were to be +5, then in act 201 the amount of shift would be +5 (which has a smaller absolute value than the equivalent of −7 per table 702).

The pitch of one of the samples or sets of samples can be shifted in act 210 without changing rhythm in any of a variety of different manners using any of a variety of public and/or proprietary techniques. The shifting of the pitch of a sample refers to, for example, shifting approximately all of the notes or sounds (e.g., a threshold number of notes or sounds) in the sample by approximately the same amount (e.g., by the same number of semitones or within a threshold number of semitones). The shifting of the pitch of a set of samples refers to shifting approximately all of the notes or sounds (e.g., a threshold number of notes or sounds) in the samples in the set by approximately the same amount (e.g., by the same number of semitones or within a threshold number of semitones).

It should be noted that although process 200 is discussed with respect to the pitch of one of the samples or sets of samples determined in act 202 or act 204 being shifted, alternatively both the pitches of the sample or set of samples determined in act 202 as well as the sample or set of samples determined in act 204 can be shifted. For example, if it is determined in act 208 that the pitch of Sample 2 is to be shifted by +5, then the pitch of Sample 2 could be shifted by +3 and the pitch of Sample 1 shifted by −2. By way of another example, if it is determined in act 208 that the pitch of Sample 2 is to be shifted by +5, then the pitch of Sample 2 could be shifted by +3 and the pitch of Sample 1 shifted by −2.

In the discussions above, reference is made to pitch distributions being determined based on how much of each pitch is present in the sample without regard for which octave the particular note is in. Alternatively, the pitch distribution can be determined based on how much of each pitch, for each of multiple notes and multiple octaves, is present in the sample. For example, the determination could be made of how much of the sample is the pitch for the note A in the first octave (A1), how much of the sample is the pitch for the note A in the second octave (A2), how much of the sample is the pitch for the note A in the third octave (A3), and so forth for each note in each octave (or at least in multiple octaves). The correlations between the determined pitch distributions and shifted versions of the determined are determined as discussed above, although there are a larger number of pitch shifts that will yield a different pitch distribution (e.g., an additional twelve pitch shifts for each additional octave). The appropriate pitch shift to increase harmony between the samples or sets is also determined and the pitch of one of the samples or sets of samples is shifted by an amount indicated by the determined pitch shift as discussed above, although different relative positive and negative shift combinations are used based on the number of octaves being used to determine the pitch distribution.

It should be noted that the pitch modification discussed herein uses the pitch distributions of the samples to understand the harmonic composition of the samples. Thus, the pitch modification need not rely on the musical key and/or chord progression in the samples.

Recommendations

The recommendation module 106 of FIG. 1 analyzes the sample metadata 124 for different samples 122 and based on this analysis generates recommendations for combining different ones of the samples 122. These recommendations are indications of how good the module 106 determines that two of the samples 122 will sound to a user when played back together.

Figure 8:
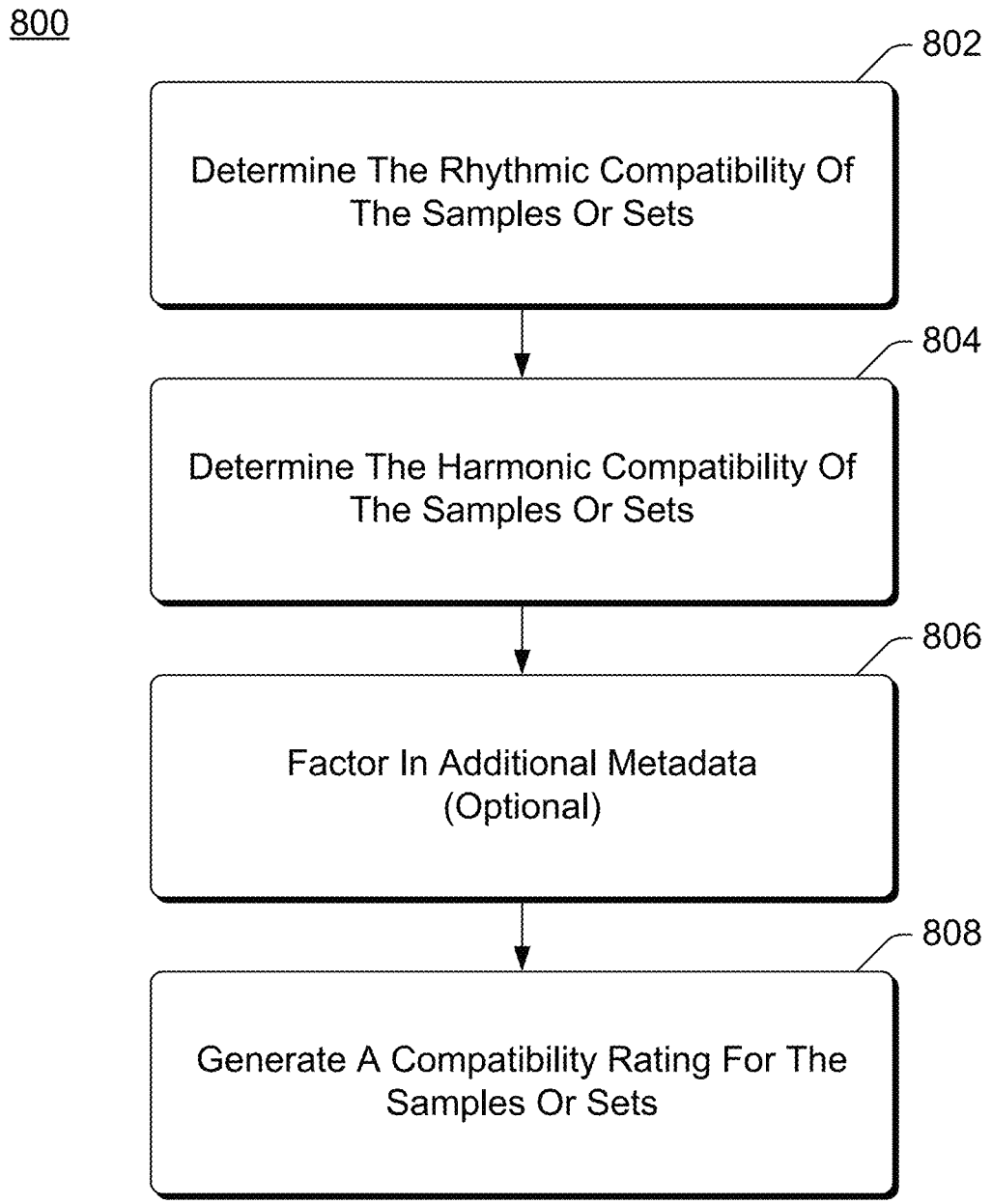
FIG. 8 is a flowchart illustrating an example process for generating a recommendation indicating how good two samples are expected to sound together in accordance with one or more embodiments.

FIG. 8 is a flowchart illustrating an example process 800 for generating a recommendation indicating how good two samples are expected to sound together in accordance with one or more embodiments. Process 800 is carried out by a recommendation module, such as recommendation module 106 of FIG. 1, and can be implemented in software, firmware, hardware, or combinations thereof. Process 800 is shown as a set of acts and is not limited to the order shown for performing the operations of the various acts. Process 800 is an example process for generating a recommendation; additional discussions of generating a recommendation are included herein with reference to different figures.

In process 800, a recommendation is generated for two samples, for a sample and a set of samples, or for two sets of samples. The recommendation can be a score indicating how good the two samples, the sample and the set of samples, or the two sets of samples are expected to sound to a user when played back together.

The rhythmic compatibility of the samples or sets is determined (act 802). The rhythmic compatibility of two samples refers to how close the rhythms of the two samples are to one another. In one or more embodiments, the tempo (e.g., the beats per minute) of the two samples are compared and assigned a rhythmic compatibility score based on how close the tempos are to one another. The closer the tempos are to one another the higher the rhythmic compatibility score is for the samples.

If the rhythmic compatibility between a sample and a set of samples, or between two sets of samples, is being determined, the tempo of a set of samples can be determined in different manners. In one or more embodiments, each sample in a set of samples is deemed to have the same tempo, and that tempo is the tempo of the set of samples. Alternatively, different samples in a set of samples can have different tempos, and the tempo of the set of samples is determined based on the tempos of the samples in the set of samples. For example, the tempo of the set of samples can be determined by averaging the tempos of the samples in the set, by using a weighted averaging of the samples in the set (e.g., higher weights applying to samples that include more notes or more instruments), and so forth.

FIG. 9 illustrates an example table 902 of scores assigned to samples based on how close their tempos are to one another in accordance with one or more embodiments. As illustrated in table 902 if the tempos of the two samples are within one threshold value (0.5%) of one another, then a rhythmic compatibility score of three points is assigned to the two samples. In one or more embodiments, if the tempos of the two samples are within 0.5% of one another after halving and/or doubling the tempos of one or both of the samples, then the samples are treated as having tempos within 0.5% of one another and are assigned a rhythmic compatibility score of three points. As further illustrated in table 902, if the tempos of the two samples are within more than one threshold value (0.5%) but less than another threshold value (10%) of one another then a rhythmic compatibility score of two points is assigned to the two samples, if the tempos of the two samples are within greater than or equal to one threshold value (10%) but less than another threshold value (20%) of one another then a rhythmic compatibility score of one point is assigned to the two samples, and so forth.

For example, referring to table 902, if one sample has a tempo of 70 beats per minute and the other sample has a tempo of 72 beats per minute, then the tempos of the two samples are within 0.5% of one another and a rhythmic compatibility score of three points is assigned to the samples. By way of further example, if one sample has a tempo of 34 beats per minute and the other sample has a tempo of 70 beats per minute, then the tempos of the two samples (with the temple of the one sample being doubled to 68 beats per minute) are within 0.5% of one another and a rhythmic compatibility score of three points is assigned to the samples. By way of yet another example, if one sample has a tempo of 70 beats per minute and the other sample has a tempo of 110 beats per minute, then the tempos of the two samples are greater than 35% of one another and a rhythmic compatibility score of negative 3 points (or alternatively zero points) is assigned to the samples.

It should be noted that the threshold values (e.g., 0.5%, 5%, 10%, etc.) and rhythmic compatibility score values illustrated in table 902 are examples, and that various other threshold values and/or rhythmic compatibility score values can alternatively be used.

Returning to FIG. 8, the harmonic compatibility of the samples or sets is determined (act 804). The harmonic compatibility of two samples refers to how close harmonically the two samples are to one another. In one or more embodiments, pitch distributions of the two samples are determined as discussed above, and the two samples are assigned a score based on a selected pitch correlation (e.g., the highest or approximately the highest (e.g., within a threshold amount of the highest) pitch correlation) between the two samples. The higher the selected pitch correlation between the two samples the higher the score is for harmonic compatibility of the samples.

The determination of harmonic compatibility in act 804 optionally takes into consideration how much pitch modification is performed in order to obtain the selected pitch correlation. The more pitch modification that is performed, the lower the score is for harmonic compatibility of the samples. In one or more embodiments, the selected pitch correlation is weighted to generate a pitch compatibility rating, with larger weights being used for selected pitch correlations obtained with less pitch modification and smaller weights being used for selected pitch correlations obtained with more pitch modification.

FIG. 10 illustrates an example table 1002 of pitch shifts and corresponding weights in accordance with one or more embodiments. As illustrated in table 1002, a pitch shift of 0 corresponds to a weight of 1.0, a pitch shift of 3 corresponds to a weight of 0.81, a pitch shift of 5 corresponds to a weight of 0.71, and so forth. The selected pitch correlation is multiplied by the weight corresponding to the amount of shift (e.g., the number of semitones) the pitch was shifted in order to obtain the pitch compatibility rating. For example, if the selected pitch correlation resulted from the pitch being shifted +3 semitones, then the selected pitch correlation is multiplied by 0.81 to obtain the pitch compatibility rating. By way of another example, if the selected pitch correlation resulted from the pitch being shifted +11 semitones, then the selected pitch correlation is multiplied by 0.98 to obtain the pitch compatibility rating (in which case the pitch compatibility rating is equal to the selected pitch correlation).

Returning to FIG. 8, in act 804 the pitch compatibility rating is used to assign a harmonic compatibility score to the samples. The higher the pitch compatibility rating is the higher the harmonic compatibility score is for the samples.

FIG. 11 illustrates an example table 1102 of scores assigned to samples based on their pitch compatibility ratings in accordance with one or more embodiments. The pitch compatibility rating is multiplied by a particular number (e.g., 10) and the score assigned as illustrated in table 1102, although alternatively different threshold values can be used in table 1102 so that no such multiplication need be performed. As illustrated in table 1102 if the pitch compatibility rating is at least one threshold value (0.90) then a harmonic compatibility score of seven points is assigned to the two samples. As further illustrated in table 1102, if the pitch compatibility rating is less than or equal to one threshold value (0.90) but greater than another threshold value (0.87) then a harmonic compatibility score of six points is assigned to the two samples, if the pitch compatibility rating is less than or equal to one threshold value (0.87) but greater than another threshold value (0.84) then a harmonic compatibility score of five points is assigned to the two samples, and so forth. For example, referring to table 1102, if the pitch compatibility rating multiplied by 10 is 0.884, then a harmonic compatibility score of six points is assigned to the samples.

It should be noted that the threshold values (e.g., 0.90, 0.87, 0.84, etc.) and harmonic compatibility score values illustrated in table 1102 are examples, and that various other threshold values and/or harmonic compatibility score values can alternatively be used.

Returning to FIG. 8, additional metadata is optionally factored in to generating a recommendation indicating how good two samples are expected to sound together (act 806). Various different score values can be assigned to the samples based on any of a variety of different metadata for the samples. Any of the metadata discussed above regarding samples can be used as a basis for assigning scores to the samples. For each of one or more of the metadata discussed above, particular values or settings can be determined to be compatible or incompatible, similar or dissimilar, desirable or undesirable, and so forth. Which values are settings are compatible or incompatible, similar or dissimilar, desirable or undesirable, and so forth can be determined in various manners, such as by being pre-configured in the recommendation module (e.g., module 106 of FIG. 1), by being maintained by another module or service accessible to the recommendation module, being based on user or administrator feedback, and so forth. Points can be assigned to two samples based on whether they are compatible or incompatible (or by how much they are compatible or incompatible), similar or dissimilar (or by how much they are similar or dissimilar), desirable or undesirable (or by how much they are desirable or undesirable), and so forth.

In one or more embodiments, the instruments used in the samples or sets of samples are used to assign scores to the samples or sets. Points can be assigned based on the presence and/or absence of particular instruments in the samples or sets, the similarity and/or differences of types of instruments (e.g., types of pianos, types of drums) in the samples or sets, and so forth. For example, a particular number of positive points can be assigned to the samples or sets if one sample or set includes an instrument that the other sample or set does not include, a particular number of negative points can be assigned to the samples or sets if the samples or sets include different types of the same instrument (e.g., one includes a classical piano and the other includes an electric piano), and so forth.

In one or more embodiments, the genres of the samples or sets are used to assign scores to the samples or sets. Points can be assigned based on the similarity of genres of the samples or sets, based on records of compatible and/or incompatible genres, and so forth. For example, a particular number of positive points can be assigned if the genres of the samples or sets are the same (e.g., both are hard rock songs, both are swing songs), a lesser number of positive points can be assigned if the genres of the samples or sets are similar (e.g., one is hard rock and the other is light rock), a particular number of negative points can be assigned if the genres of the samples or sets are included on an incompatible genres list (e.g., one is heavy metal and the other is easy listening), and so forth.

In one or more embodiments, the feel or rhythm pattern of the samples or sets are used to assign scores to the samples or sets. Points can be assigned based on the similarity of the feel or rhythm pattern of the samples or sets, based on records of compatible and/or incompatible feels, compatible and/or incompatible rhythm patterns, and so forth. For example, a particular number of positive points can be assigned if the feel or rhythm patterns of the samples or sets are the same (e.g., both are swing sounds), a particular number of negative points can be assigned if the feel or rhythm patterns of the samples or sets are included on an incompatible feel or rhythm patterns list (e.g., one is a swing sound and the other is a metronomic band type of sound), and so forth.

In one or more embodiments, the moods of the samples or sets are used to assign scores to the samples or sets. Points can be assigned based on the similarity of moods of the samples or sets, based on records of compatible and/or incompatible moods, and so forth. For example, a particular number of positive points can be assigned if the moods of the samples or sets are the same (e.g., both are sad songs), a particular number of negative points can be assigned if the moods of the samples or sets are included on an incompatible moods list (e.g., one is sad and the other is upbeat/happy), and so forth.

A compatibility rating for the samples or sets is generated (act 808). In one or more embodiments, the compatibility rating is generated by combining the scores or points (e.g., adding the points assigned in acts 802, 804, and 806). The compatibility rating is, for example, a score indicating how good the samples or sets are expected to sound together if combined. Two samples or sets having a higher compatibility rating are expected to sound better together (there is a larger amount of compatibility between the samples or sets) to a user than two samples or sets having a lower compatibility rating (there is a smaller amount of compatibility between the samples or sets). Alternatively, the compatibility rating can take other forms, such as an indication or value that the scores or points (e.g., after adding the points assigned in acts 802, 804, and 806) map to or otherwise correspond to. For example, the summation (or other combination or selection of) the points can be mapped to a binary indication (e.g., "will sound good" or "will sound bad"). By way of another example, the summation (or other combination or selection of) the points can be mapped to other values indicating whether the two samples or sets are expected to sound good together (e.g., an indication of A or "High" for the largest point summations, and an indication of "F" or "Bad" for the lowest point summations).

In the discussion of process 800, reference is made to two samples or sets having higher scores being expected to sound better if combined than two samples or sets having lower scores. Alternatively, the assigning of points can be the opposite (e.g., fewer points for greater similarity), resulting in two samples or sets having lower scores being expected to sound better if combined than two samples or sets having higher scores.

Additionally, although reference is made to numeric points and scores, any other ranking scheme can be used. For example, letter scores or low/medium/high values may be assigned in acts 802, 804, and 806 and combined in any of a variety of manners (e.g., averaging letter grades, listing low/medium/high values for each of acts 802, 804, and 806 separately, etc.).

Audio Combining

The audio combining module 112 of FIG. 1 combines different samples or sets of samples, optionally creating a new sample or set of samples. References herein to samples or sets of samples being combined include situations in which a sample is combined with another sample, situations in which a sample is combined with a set of samples, and situations in which a set of samples is combined with another set of samples. The result of combining samples and/or sets can be a new sample or a new set of samples, or the previous sample or set can be replaced by the combined sample or set.

Figure 12:
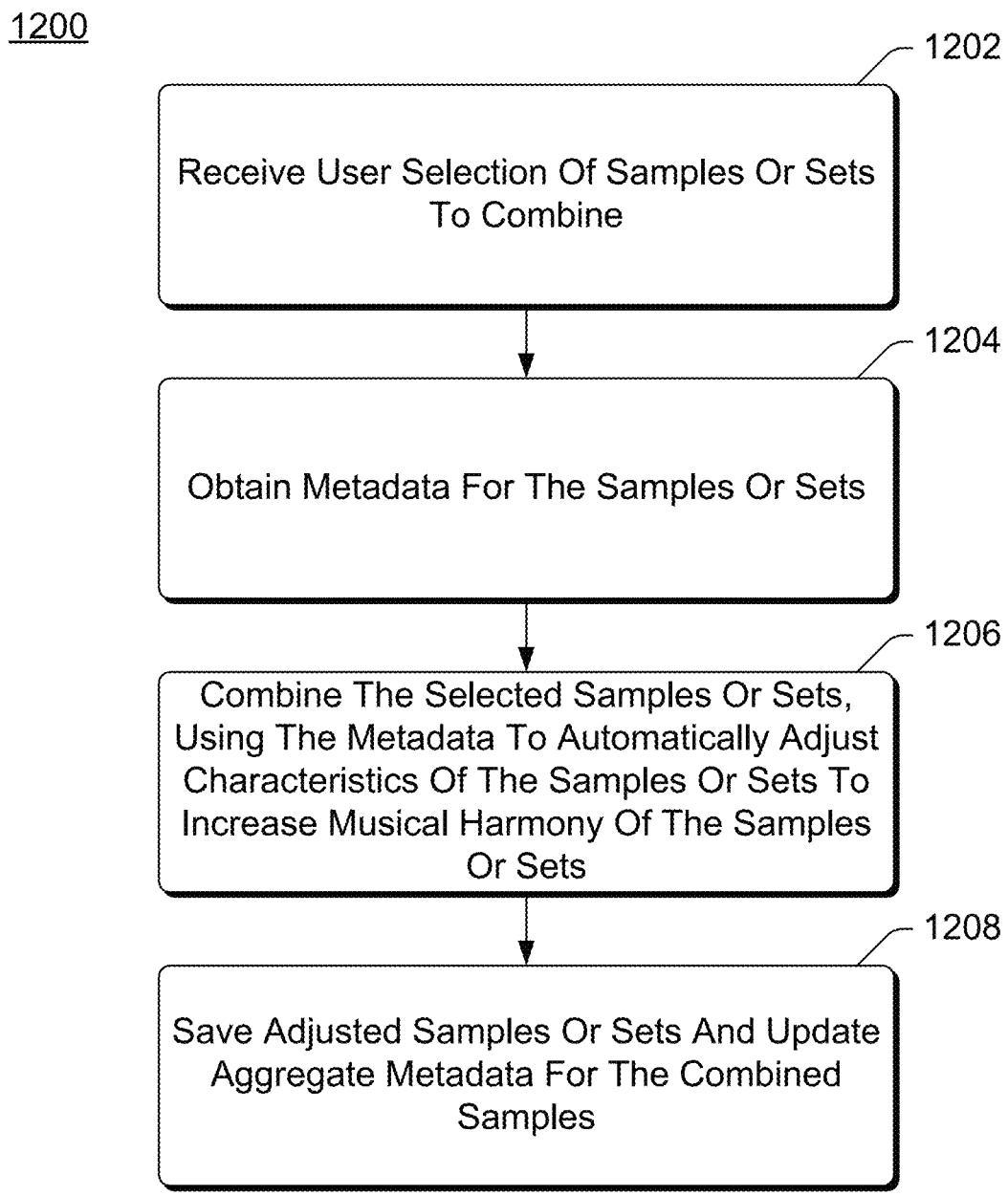
FIG. 12 is a flowchart illustrating an example process for combining audio samples in accordance with one or more embodiments.

FIG. 12 is a flowchart illustrating an example process 1200 for combining audio samples in accordance with one or more embodiments. Process 1200 is carried out by an audio combining module, such as audio combining module 112 of FIG. 1, and can be implemented in software, firmware, hardware, or combinations thereof. Process 1200 is shown as a set of acts and is not limited to the order shown for performing the operations of the various acts. Process 1200 is an example process for combining audio samples; additional discussions of combining audio samples are included herein with reference to different figures.

In process 1200, a user selection of samples and/or sets to combine is received (act 1202). The user selection can be received via any of a variety of different user inputs as discussed above. For example, the user selection of a sample or set can be selection of a sample or set from a menu, selection of an icon or other graphical representation of a sample or set, and so forth. The user can select samples and/or sets based on whatever criteria he or she desires—although in some situations recommendations can be made to a user regarding which samples and/or sets to select, the user need not accept such recommendations, and in other situations no such recommendations are made to the user.

Metadata for the samples or sets is obtained (act 1204). The metadata can be obtained in various manners, such as by retrieving previously generated metadata, generating the metadata in response to selection of a sample or set, and so forth. In one or more embodiments, the metadata obtained in act 1204 is the metadata corresponding to the samples or sets selected in act 1202. Alternatively, the metadata for multiple samples or sets (e.g., samples or sets for which a user selection may be received) can be obtained prior to receiving the user selection of samples or sets in act 1202.

Various different user experiences can be displayed or otherwise presented to the user to facilitate user selection of samples or sets to combine. In one or more embodiments, the user can select search criteria (e.g., any of the parameters included in metadata) and have identifiers of the samples or sets that satisfy the search criteria displayed to the user for his or her selection. For example, the user could choose to search for samples or sets with instrumentation of piano or drums, for a genre of jazz, and so forth.

Recommendations for samples or sets to combine can also optionally be presented to the user. A user selection of a sample or set of samples can be received, and one or more recommendations of samples or sets to combine with the user selected sample or set can be determined. The recommendations can be determined in various manners, such as by generating, for each of multiple samples or sets that may possibly be combined with the user selected sample or set, a compatibility rating between the one of the multiple samples or sets and the user selected sample or set as discussed above. One or more of the multiple samples or sets having the largest compatibility ratings can be presented to the user, and a user selection of one of the presented samples or sets can be received.

The samples or sets selected in act 1202 are combined using the metadata corresponding to the samples or sets to automatically adjust characteristics of at least one of the samples to increase musical compatibility of the samples (act 1206). The samples or sets are combined in response to a user request to combine the samples or sets, which can be received via any of a variety of user inputs as discussed above. For example, a user-selectable "combine" button, icon, menu item, etc. can be displayed and selected by the user to request that the selected samples or sets be combined. By way of another example, selection of the samples or sets can be a user request to combine the samples or sets. Any expression of user intent to combine the samples or sets can be used with the techniques discussed herein.

Various different characteristics of at least one of the samples or sets can be adjusted, such as the rhythm of a sample or set, the pitch of a sample or set, the instrumentation of a sample or set, and so forth. Thus, the adjustment in act 1206 can include adjusting the rhythm of a sample or set so that the samples or sets sound rhythmically coherent, adjusting the pitch of a sample or set so that the samples or sets sound harmonically coherent, adjusting other metadata/parameters of the sample or set so that the samples or sets sound coherent (e.g., instrumentation and genre coherent), combinations thereof, and so forth.

Figure 13:
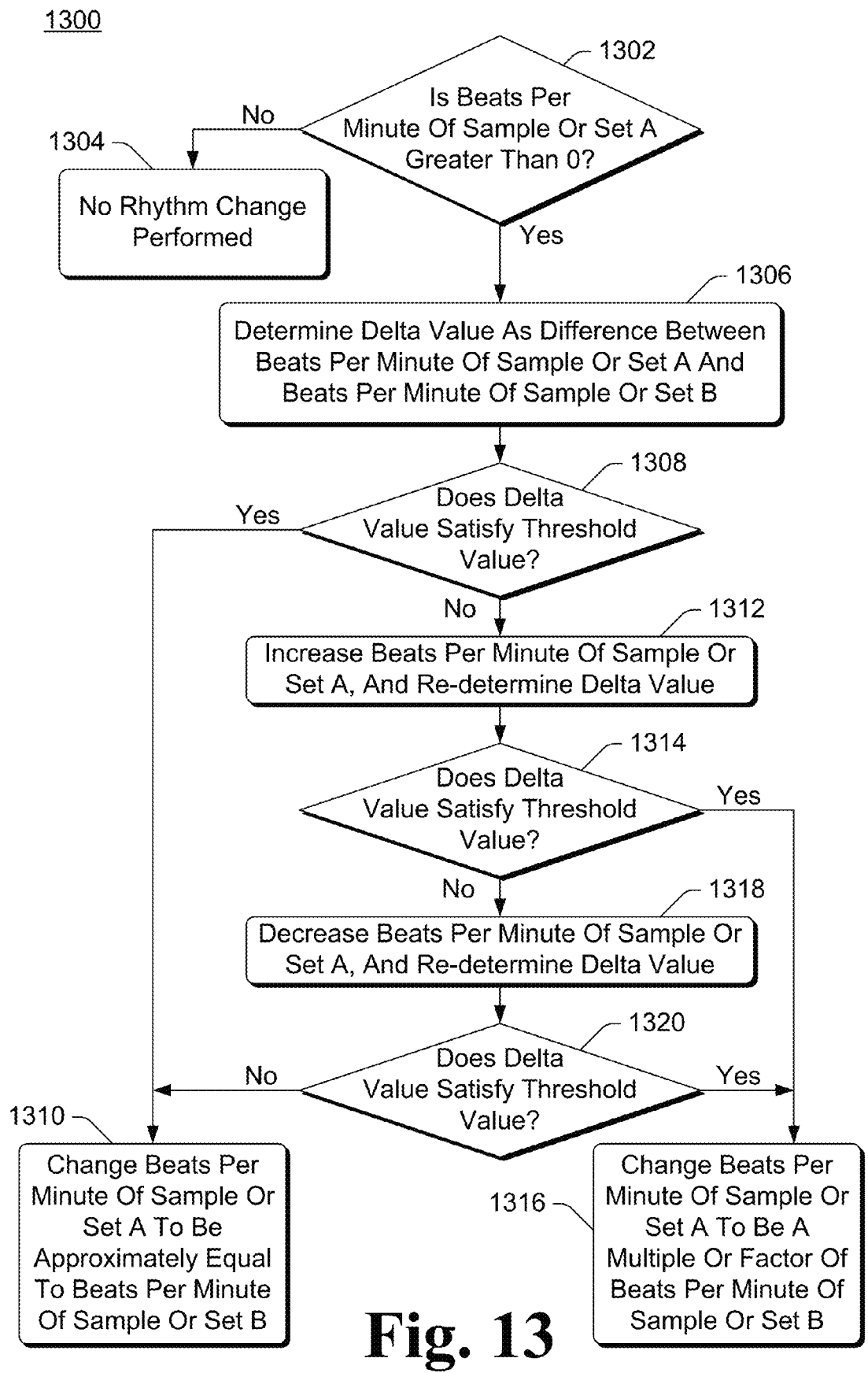
FIG. 13 is a flowchart illustrating an example process for adjusting the rhythm of a sample or set of samples so that the samples or sets sound rhythmically coherent in accordance with one or more embodiments.

The rhythm of a sample or set can be adjusted in any of a variety of different manners. FIG. 13 is a flowchart illustrating an example process 1300 for adjusting the rhythm of a sample or set of samples so that the samples or sets sound rhythmically coherent in accordance with one or more embodiments. Process 1300 is implemented as part of act 1206 of process 1200 of FIG. 12. Process 1300 is shown as a set of acts and is not limited to the order shown for performing the operations of the various acts. Process 1300 is an example process for adjusting the rhythm of a sample so that the samples or sets sound rhythmically coherent; additional discussions of adjusting the rhythm of a sample or sets so that the samples sound rhythmically coherent are included herein with reference to different figures.

In process 1300, reference is made to a sample or set A and a sample or set B. Sample or set A, as well as sample or set B, is one of the samples (or sets of samples) selected by the user in act 1202 of FIG. 12. Sample or set A, as well as sample or set B, has corresponding metadata that identifies the tempo or beats per minute (BPM) of the sample or set as discussed above.

A check is made as to whether the beats per minute of sample or set A is greater than zero (act 1302). If the beats per minute of sample or set A is not greater than zero (e.g., is equal to zero), or the sample or set A is otherwise identified as being a oneshot, then no rhythm change of the sample or set A is performed (act 1304). In situations in which the sample or set A is a oneshot, the sample or set A sounds rhythmically coherent with the sample or set B without any rhythmic modification. It should be noted that whether the beats per minute of sample or set A is greater than zero can be determined in various different manners, such as using digital signal processing algorithms, by a musician, and so forth.

However, if the beats per minute of sample or set A is greater than zero, then a delta value is determined (act 1306). The delta value in act 1306 is the difference between the beats per minute of sample or set A and the beats per minute of sample or set B, and can optionally be the absolute value of this difference.

A check is made as to whether the delta value satisfies a threshold value (act 1308). The threshold value is a value that, if satisfied by the delta value, is expected to result in allowing the rhythm of sample or set A to be changed and still sound acceptable to a user. For example, the threshold value can be 20, although other values can alternatively be used. If the delta value is an absolute value then the delta value satisfies the threshold value if the delta value is less than (or alternatively less than or equal to) the threshold value. If the delta value is not an absolute value then the delta value satisfies the threshold value if the delta value is less than (or alternatively less than or equal to) the threshold value (e.g., 20) and greater than (or alternatively greater than or equal to) the negative of the threshold value (e.g., −20).

If the delta value satisfies the threshold value, then the beats per minute of sample or set A is changed to be approximately equal to (e.g., within a threshold amount of) the beats per minute of sample or set B (act 1310). The beats per minute of sample or set A can be changed by increasing or decreasing the beats per minute of sample or set A using any of a variety of public and/or proprietary techniques, such as using any of various stretching algorithms. Alternatively, the beats per minute of sample or set B can be changed to be approximately equal to (e.g., within a threshold amount of) the beats per minute of sample or set A, or both the beats per minute of sample or set A and the beats per minute of sample or set B can be changed so that the beats per minute are approximately the same (e.g., within a threshold amount of one another). For example, the beats per minute of sample or set A can be increased and the beats per minute of sample or set B can be decreased, or the beats per minute of sample or set A can be decreased and the beats per minute of sample or set B can be increased.

However, if the delta value does not satisfy the threshold value then the beats per minute of sample or set A is increased and the delta value is re-determined (act 1312). In one or more embodiments the increasing in act 1312 refers to doubling the beats per minute of sample or set A, although the beats per minute of sample or set A can alternatively be increased by other amounts. The delta value is re-determined as the difference between the increased beats per minute of sample or set A and the beats per minute of sample or set B.

After increasing the beats per minute of sample or set A, a check is made as to whether the delta value, as re-determined in act 1312, satisfies a threshold value (act 1314). The threshold value in act 1314 can be the same as the threshold value in act 1308.

If the delta value satisfies the threshold value, then the beats per minute of sample or set A is changed to be a factor of the beats per minute of sample or set B (act 1316). The beats per minute of sample or set A can be changed by increasing or decreasing the beats per minute of sample or set A using any of a variety of public and/or proprietary techniques, such as using any of various stretching algorithms. The factor in act 1316 is dependent on the amount of the increase in act 1312, and in one or more embodiments is the reciprocal of the increase multiplier. For example, if beats per minute of sample or set A were doubled in act 1312 (an increase multiplier of 2), then the factor in act 1316 would be ½. Thus, if the beats per minute of sample or set A were 35 and the beats per minute of sample or set B were 80, then the beats per minute of sample or set A would be increased to 70.

However, if the delta value does not satisfy the threshold value in act 1314, then the beats per minute of sample or set A is decreased and the delta value is re-determined (act 1318). In one or more embodiments the decreasing in act 1318 refers to halving the beats per minute of sample or set A, although the beats per minute of sample or set A can alternatively be decreased by other amounts. The delta value is re-determined as the difference between the decreased beats per minute of sample or set A and the beats per minute of sample or set B.

After decreasing the beats per minute of sample or set A, a check is made as to whether the delta value, as re-determined in act 1318, satisfies a threshold value (act 1320). The threshold value in act 1320 can be the same as the threshold value in acts 1308 and 1314.

If the delta value satisfies the threshold value, then the beats per minute of sample or set A is changed to be a multiple (e.g., integer multiple) of the beats per minute of sample or set B (act 1316). The beats per minute of sample or set A can be changed by increasing or decreasing the beats per minute of sample or set A using any of a variety of public and/or proprietary techniques, such as using any of various stretching algorithms. The multiple in act 1316 is dependent on the amount of the increase in act 1312, and in one or more embodiments is the reciprocal of the decrease multiplier. For example, if beats per minute of sample or set A were halved in act 1318 (a decrease multiplier of ½), then the multiple in act 1316 would be 2. Thus, if the beats per minute of sample or set A were 62 and the beats per minute of sample or set B were 30, then the beats per minute of sample or set A would be increased to 60.

However, if the delta value does not satisfy the threshold value in act 1320, then the beats per minute of sample or set A is changed to be approximately equal to (e.g., within a threshold amount of) the beats per minute of sample or set B (act 1310).

Returning to FIG. 12, alternatively the rhythm of a sample or set can be adjusted in other manners in act 1206. For example, the beats per minute of one sample or set can be changed to be approximately equal to (e.g., within a threshold amount of) the beats per minute of the other sample or set. By way of another example, the beats per minute of one sample or set can be changed to be approximately equal to (e.g., within a threshold amount of) a particular factor or multiple of the beats per minute of the other sample or set. By way of another example, rhythmic coherence can be achieved by aligning individual beat locations from one sample or set to another sample or set (e.g., by moving individual note locations in a sample or set dynamically so that individual events in one sample or set are aligned with events in another sample or set, by stretching a sample or set so that the beat locations are aligned, etc.). When aligning such individual beat locations, the beats per minute of samples or sets can be ignored.

The pitch of a sample or set can be adjusted in act 1206 so that the samples or sets sound harmonically coherent by automatically adjusting the pitch of one or more of the samples or sets. In one or more embodiments, if a sample is pitched (e.g., the sample has one or more pitches) then the system analyzes the sample and changes its one or more pitches as appropriate. However, if the sample is unpitched (e.g., the sample does not have at least one pitch) then the system does not attempt to change the pitch of the sample.

The pitch of one or more of the samples or sets can be modified as discussed above with reference to process 200 of FIG. 2. Alternatively, the pitch of one or more of the samples or sets can be modified in other manners.

In one or more embodiments, the pitch of a sample or set can be adjusted based on a mode of the sample or set. The mode of the sample or set can be determined based on a lowest note or notes in the sample or set. Various mappings and/or other rules can be used to determine an amount to shift the pitch of a sample or set given its mode, such as mappings of how much to shift the pitch of a sample or set in one mode into each of multiple other modes. For example, a mapping of how to pitch shift a sample in a Lydian mode into a generic Ionian mode.

In other embodiments, the pitch of a sample or set can be adjusted based on key centers of the samples or sets. The key center of each sample or set can be determined, and the distance between the key centers determined. The distance can be, for example, plus or minus 6 semitones. The pitch of one of the samples or sets can then be shifted by that determined distance, resulting in the key centers of the samples or sets being the same.

In other embodiments, the pitch of a sample or set can be adjusted by identifying the whole-step and half-step relationships between the notes included in the sample or set (optionally without regard for which octaves the notes are in), and attempting to map the relationships to a diatonic scale. If there is a direct match of the whole-step and half-step relationships between the notes included in the sample or set to the whole-step and half-step relationships between the notes in a diatonic scale, then the notes in the set or sample are mapped to that diatonic sale. If there is no such direct match, then an attempt is made to map the whole-step relationships to a diatonic scale while reducing the number of differences in the half-step relationships. If there is such a diatonic scale, then the notes in the set or sample are mapped to that diatonic scale. If there is no such diatonic scale, then the notes in the set or sample are mapped to a diatonic scale having smallest (or within a threshold number of the smallest) divergent notes and differences between half-step relationships. Alternatively, attempts may be made to map the whole-step and half-step relationships between the notes to other non-diatonic scales (e.g., harmonic minor scales).

In addition to adjustments for rhythmic coherence and harmonic coherence, additional adjustments can also be made in act 1206. For example, the instrumentation or genre of a sample or set can be adjusted to increase the instrumentation and genre coherence of the samples or sets. Various different rules or criteria can be used to increase the instrumentation and genre coherence of the samples or sets, and these rules or criteria are designed based on the way instruments work or sound together and to improve the way two samples or sets are expected to sound to a user when combined by adjusting the instrumentation of one or more of the samples or sets.

The instrumentation of a sample or set can be changed so that a different type of instrument is used based on the instrumentation or genre of the other sample or set. For example, if the genre of one sample or set is honky-tonk piano, then the instrument of the other sample or set may be changed from a classical grand piano to a slightly out-of-tune piano. The instrumentation of a sample or set can also be changed so that the role of the instruments in a sample or set changes. For example, if one sample includes one or more instruments in mid-range octaves, then a mid-range piano instrument in another sample may be changed to a bass role by re-pitching the sample down one or two octaves.

By way of another example, an additional adjustment that can be made in act 1206 is the moving of beat locations in a sample or set. Situations can arise where the beat is not a static number of beats per minute, but varies slightly. An additional adjustment that can be made in act 1206 is to move the beat locations in the sample or set as appropriate to achieve a static number of beats per minute. For example, a sample or set may have some portions having a rhythm of 58 beats per minute, other portions having a rhythm of 59.5 beats per minute, other portions having a rhythm of 61 beats per minute, and so forth. Following this example, the rhythms in the different portions of the sample or set can be adjusted so that all of the portions have the same number of beats per minute (e.g., 60 beats per minute). In the case where a sample does not have metronomic rhythm, it can also be possible to "move" the individual note event locations so that they align with a static metronome value.

In one or more embodiments, the adjustments for rhythmic coherence, harmonic coherence, and/or other adjustments made in act 1206 are also based on the context of the combining of samples or sets. The context can include how the samples or sets were used or are intended to be used. For example, a sample or set may be compatible with some samples or sets but not others (e.g., a previously recorded sample may or may not be compatible with a sample being recorded as part of a live performance). The context can be specified in various manners, such as by a user, by the audio combining system, by another component or module, and so forth.

The context of the combining of the samples or sets can also refer to particular subsets of the samples or sets being used as the basis for combining. In the discussions above, the combining is discussed as being based on the metadata corresponding to the samples or sets, however not all of the metadata need be used. The context of the combining of the samples or sets allows particular aspects of the samples or sets to be identified (e.g., particular metadata parameters). For example, particular notes from the notes used in the sample metadata may be selected, so that the pitch distribution and pitch modification analysis discussed above is performed based on those selected notes without regard for the other notes (e.g., the percentage of pitches of non-selected notes in the sample can be set to zero). By way of another example, particular instruments from the instrumentation metadata may be selected, and the adjustment of parameters based on those selected instruments rather than the non-selected instruments.

The adjusted samples or sets and the aggregate metadata corresponding to the combined samples or sets are also saved (act 1208). The adjusted sample or set can be saved as a new sample or set (e.g., a new sample 122 in the audio store 120), or alternatively the adjusted sample or set can overwrite and replace the previous version of the sample. If two samples are combined, then a new set of samples can be created that includes both of the samples (one or more of which may have been adjusted as discussed above). If a sample is combined with a set of samples, then the sample (which may have been adjusted as discussed above) is added to the set of samples or alternatively a new set of samples that includes the set of samples and the sample with which the set is being combined may be generated. The metadata corresponding to the sample and/or set of samples is updated as appropriate to reflect the adjustment of the sample and/or the addition of the sample to the set of samples.

Alternatively, the adjusted samples and/or the aggregate metadata need not be saved. For example, the combined samples can be played back (e.g., as a live performance) without being saved.

In one or more embodiments, the adjusted samples or sets as well as the aggregate metadata corresponding to the combined samples or sets is saved automatically. Alternatively, the adjusted samples or sets as well as the aggregate metadata corresponding to the combined samples or sets are saved only in response to user request to save the combined samples or sets. For example, a user may be permitted to audition the combination of samples or sets by playing back the combination of samples or sets and saving the adjusted samples and the aggregate metadata corresponding to the combined samples or sets only if the user likes what he or she hears (or otherwise desires to save the combination). The user can then select a different combination to audition, allowing the user to listen to combinations of multiple different samples or sets before saving a combination that he or she likes.

Figure 14:
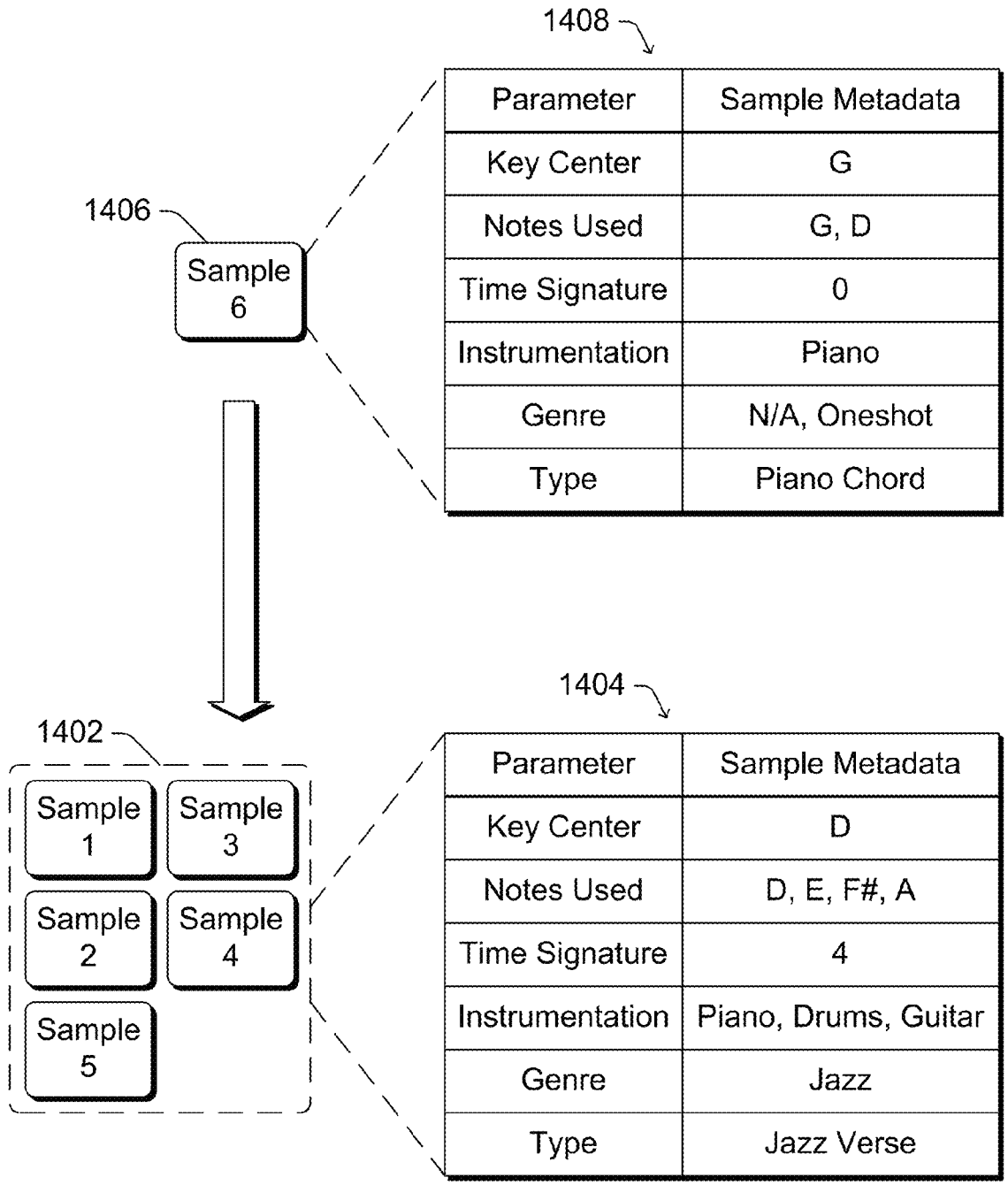
FIGS. 14 and 15 illustrate an example of combining a sample with a set of samples in accordance with one or more embodiments.
Figure 15:
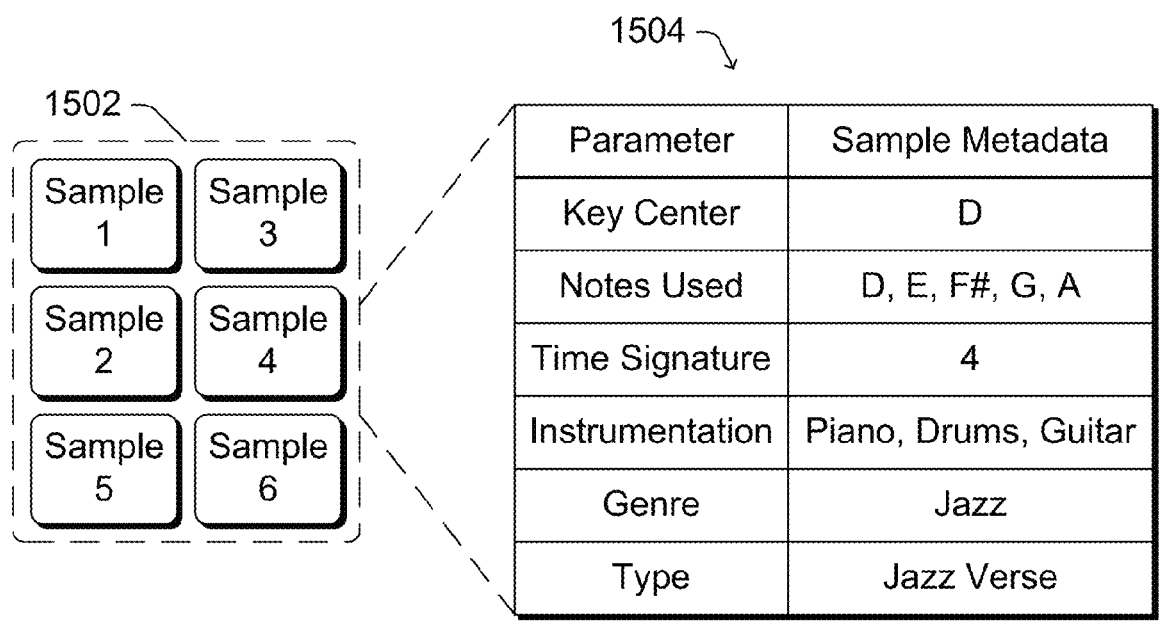

FIGS. 14 and 15 illustrate an example of combining a sample with a set of samples in accordance with one or more embodiments. In FIG. 14, a set of samples 1402 is illustrated having corresponding metadata 1404. The set of samples 1402 includes five samples (Sample 1, Sample 2, Sample 3, Sample 4, and Sample 5). A sample 1406 having corresponding metadata 1408 is combined with the set of samples 1402, resulting in the set of samples 1502 illustrated in FIG. 15. The set of samples 1502 has corresponding metadata 1504, which is the metadata 1404 updated to reflect the addition of Sample 6 (e.g., the notes used metadata is updated to reflect the note G, which was not included in the metadata 1404).

In the discussions herein, reference is made to samples being combined. It should be noted that situations can also occur in which one sample is removed from a set of samples. A sample can be removed for various reasons, such as in response to a user input requesting the sample be removed, in response to a determination that the sample is incompatible with another sample added to the set of samples, and so forth. In response to a sample being removed from a set of samples, the metadata corresponding to the set of samples is updated to reflect that the removed sample is no longer included in the set of samples. For example, if Sample 6 were to be removed from the set of samples 1502, the metadata 1504 would be updated to reflect that the notes used no longer include the note G.

Thus, using the audio combining discussed herein, various sounds (such as different notes, different chords, different sections of a song, and so forth) selected by a user can be automatically combined with various other sounds (such as different notes, different chords, different sections of a song, and so forth) selected by the user. For example, a particular chord played on a guitar could be automatically added to a set of samples including piano and drum sounds. By way of another example, a particular drum sound could be automatically added to a set of samples including piano and voice (singing) sounds. The user can simply select the audio samples or sets of audio samples he or she desires to have combined, and have those samples or sets automatically combined.

Automatic Sample Set Expansion

The audio combining module 112 of FIG. 1 combines different samples or sets of samples, optionally creating a new sample or set of samples. A sample can be combined with another sample or a set of samples. Similarly, a set of samples can be combined with another set of samples or a sample. A set of samples can be automatically expanded by the audio combining module 112. Automatically expanding a set of samples refers to automatically adding one or more samples or sets to the set of samples. No user selection of which samples or sets are to be added to the set being expanded need be received.

Figure 16:
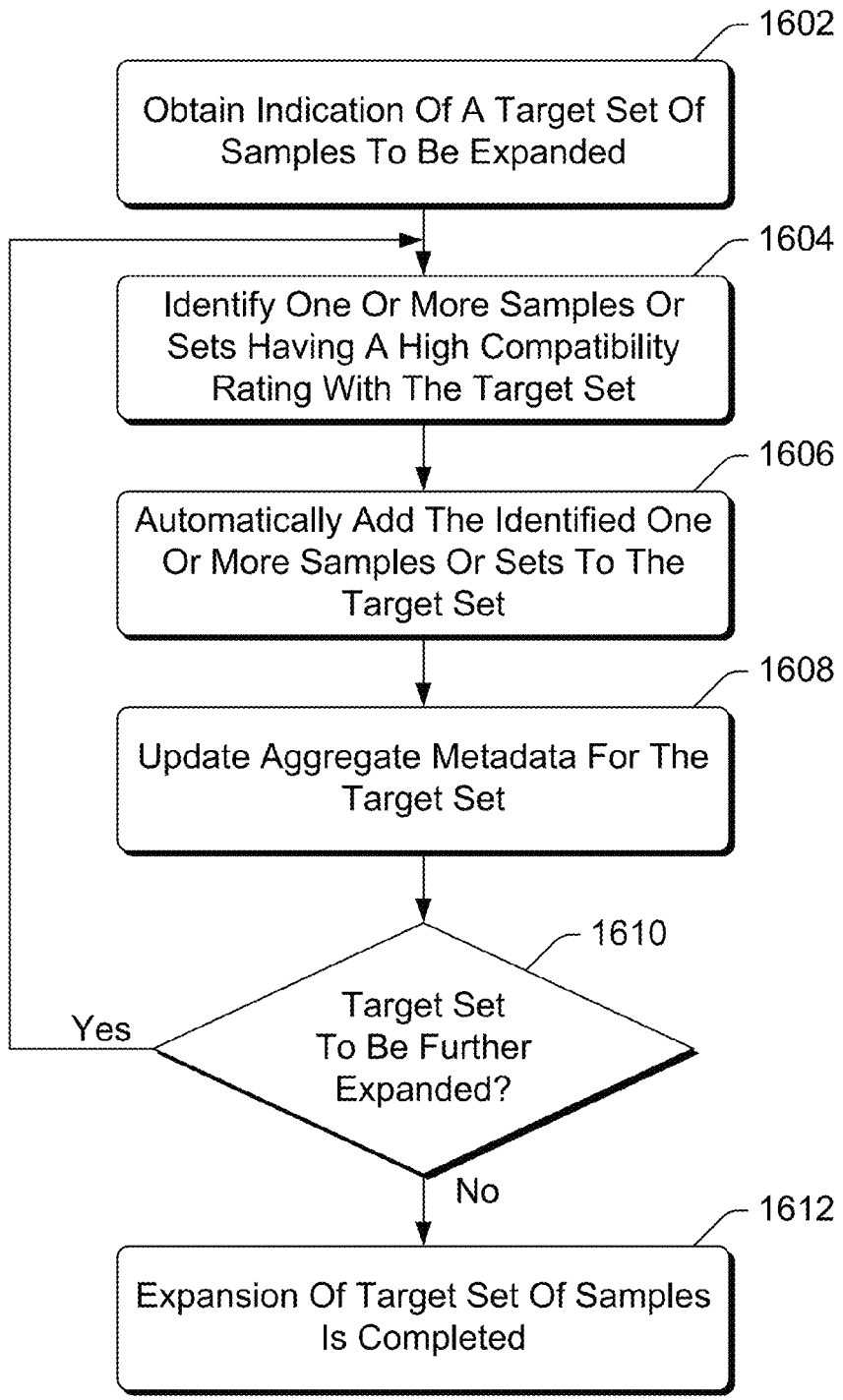
FIG. 16 is a flowchart illustrating an example process for automatically expanding a set of samples in accordance with one or more embodiments.

FIG. 16 is a flowchart illustrating an example process 1600 for automatically expanding a set of samples in accordance with one or more embodiments. Process 1600 is carried out by an audio combining module, such as audio combining module 112 of FIG. 1, and can be implemented in software, firmware, hardware, or combinations thereof. Process 1600 is shown as a set of acts and is not limited to the order shown for performing the operations of the various acts. Process 1600 is an example process for automatically expanding a set of samples; additional discussions of automatically expanding a set of samples are included herein with reference to different figures.

In process 1600, an indication of a set of samples to be expanded is obtained (act 1602). This set of samples is also referred to as a target set, as the target set is the set of samples that is the target of the expansion. The target set can include one or more samples.

One or more samples or sets of samples having a high compatibility rating with the target set are identified (act 1604). The compatibility ratings of the samples or sets are generated based on the rhythmic compatibility of the samples or sets, the harmonic compatibility of the samples or sets, and/or additional metadata as discussed above (e.g., with reference to process 800 of FIG. 8). The one or more samples or sets of samples having a high compatibility rating with the target set can be, for example, the one or more samples or sets of samples having the highest compatibility rating with the target set, the one or more samples or sets of samples having at least or greater than a threshold compatibility rating, and so forth.

The identified one or more samples or sets of samples are automatically added to the target set (act 1606). The one or more samples or sets of samples are added to the target set by automatically adjusting characteristics of the samples or sets to increase musical harmony of the samples or sets analogous to the discussion above (e.g., regarding act 1206 of FIG. 12). However, in act 1606 the one or more samples are automatically identified rather than being user selected.

The aggregate metadata for the target set is updated to reflect the metadata of the added sample or set (act 1608). The metadata is updated analogous to the discussion above (e.g., regarding act 1208 of FIG. 12).

Process 1600 then proceeds based on whether the target set is to be further expanded (act 1610). In one or more embodiments, the target set of samples can include a particular number of samples, and the target set is expanded by repeatedly adding a sample or set of samples to the target set until the particular number of samples are included in the target set. Alternatively, whether the target set is to be further expanded can be determined in other manners, such as in response to user input indicating how many samples are to be added to the target set or whether an additional sample is to be added to the target set, in response to input from another component or module, and so forth.

If the target set is to be further expanded, then process 1600 returns to identify one or more samples or sets having a high compatibility with the target set (act 1604). It should be noted that when returning to act 1604, the metadata corresponding to the target set may have been changed in act 1608, and thus which samples or sets having a high compatibility rating with the target set may have changed since the previous identification of one or more samples in act 1604.

However, if the target set is not to be further expanded, then the expansion of the target set of samples is completed (act 1612). If not previously saved (e.g., in act 1606), the target set of samples is also saved in act 1612.

As discussed with reference to process 1600, one set of samples can be added to a target set. Different groupings of samples can be available to the audio combining module 112, each grouping being a set of samples having a particular theme or being musically coherent. For example, a grouping may be a set of samples of drum sounds (e.g., kick, snare, tome, hihat, crash, cowbell, etc.), a set of samples of people screaming or cheering, and so forth. Multiple different groupings of these different themes can be included, and a user input requesting a particular theme can be received. In response to the user request, a grouping having a high compatibility rating with the target set (e.g., the grouping having the highest compatibility rating with the target set) is automatically added to the target set. For example, a user may request to add a grouping of people cheering to a target set, and in response the grouping of people cheering that has the highest compatibility rating with the target set can be added to the target set.

Various other factors can also be used in determining which samples or sets have a high compatibility rating with the target set, and/or in selecting which samples or sets having a high compatibility rating with the target set are to be automatically added to the target set. Any of the metadata discussed above regarding samples can be used as a basis for determining which samples or sets have a high compatibility rating with the target set, and/or in selecting which samples or sets having a high compatibility rating with the target set are to be automatically added to the target set.

By way of example, the sample type can be used to determine which samples or sets having a high compatibility rating with the target set are to be automatically added to the target set. Samples or sets having a high compatibility rating with the target set can be selected so that the target set maintains the same types of samples (e.g., stems or oneshots), or a same ratio of types of samples (e.g., if the target set includes a 7:3 ratio of stems to oneshots, then the samples or sets having a high compatibility rating with the target set can be selected from so that the target set maintains the 7:3 stems to oneshots ratio).

By way of another example, the role of the target set can also be identified, and the samples or sets having a high compatibility rating with the target set can be selected so that that role is complemented or continued. E.g., if the target set includes multiple oneshot samples deemed to be bass notes by the audio combining module (e.g., based on a list or other record of which notes are bass notes and which are not), then samples or sets having a high compatibility rating with the target set and are also bass oneshots can be selected to be automatically added to the target set. Or, samples or sets having a high compatibility rating with the target set and which include stems of non-bass notes can be selected to be automatically added to the target set.

The automatically expanding a set of samples can also include expanding the set of samples by automatically replacing one or more samples or sets in the set of samples with one or more other samples or sets. This automatic replacement is also referred to as re-orchestration of the set of samples. Which samples or sets in the set of samples are to be replaced can be identified in different manners, such as randomly, based on particular metadata corresponding to the samples, and so forth. The samples or sets can be replaced with one or more other samples or sets having a high compatibility rating with the target set (e.g., in act 1604 as discussed above), or with one or more samples or sets having a high compatibility rating with the sample or set being replaced (e.g., in act 1604 the high compatibility rating is based on the set or sets being replaced rather than the target set). When replacing a sample or set of samples, the aggregate metadata for the target set is updated as appropriate in act 1608 to reflect the metadata of the added sample or set as well as reflect that the replaced sample or set of samples is no longer included in the target set of samples.

Thus, using the automatic sample set expansion discussed herein, various sounds (such as different notes, different chords, different sections of a song, and so forth) can be automatically added to a set of audio samples (e.g., a song). Different samples or groups be automatically added to a set of audio samples so that the set of audio samples includes a threshold number of samples.

Example System

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 17:
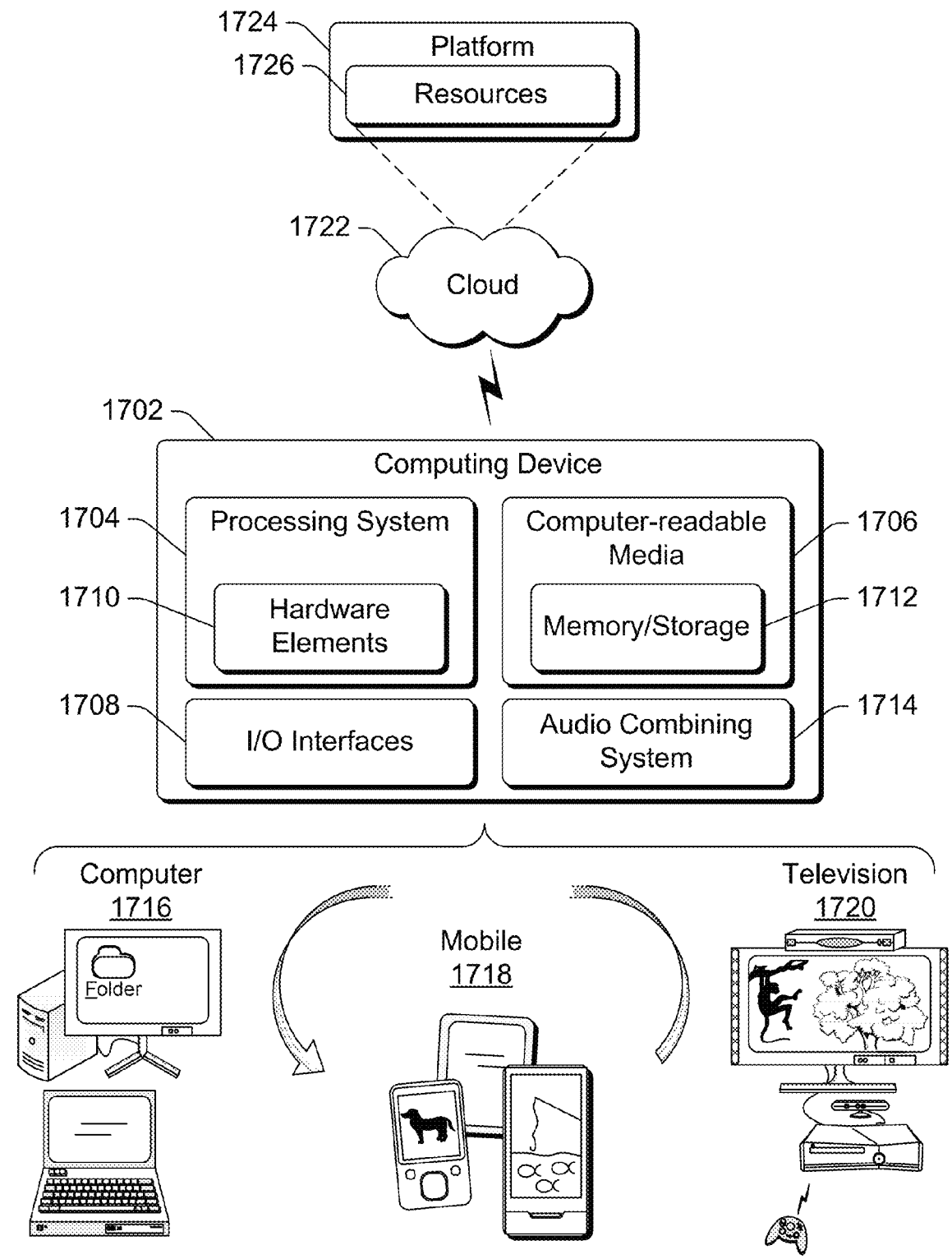
FIG. 17 illustrates an example system that includes an example computing device that is representative of one or more systems and/or devices that may implement the various techniques described herein.

FIG. 17 illustrates an example system generally at 1700 that includes an example computing device 1702 that is representative of one or more systems and/or devices that may implement the various techniques described herein. The computing device 1702 may be, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O Interfaces 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware elements 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1706 is illustrated as including memory/storage 1712. The memory/storage 1712 represents memory/storage capacity associated with one or more computer-readable media. The memory/storage 1712 may include volatile media (such as random access memory (RAM)) and/or nonvolatile media (such as read only memory (ROM), Flash memory, optical disks, magnetic disks, and so forth). The memory/storage 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1702 may be configured in a variety of ways as further described below to support user interaction.

Computing device 1702 also includes an audio combining system 1714. Audio combining system 1714 provides various functionality for combining sounds, such as performing rhythm modification, pitch modification, generating recommendations, combining samples, combinations thereof, and so forth as discussed above. Audio combining system 1714 can implement, for example, audio combining system 100 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1710. The computing device 1702 may be configured to implement particular instructions and/or functions corresponding to the software and/or hardware modules. Accordingly, implementation of modules as a module that is executable by the computing device 1702 as software may be achieved at least partially in hardware, e.g., through use of computer-readable storage media and/or hardware elements 1710 of the processing system. The instructions and/or functions may be executable/operable by one or more articles of manufacture (for example, one or more computing devices 1702 and/or processing systems 1704) to implement techniques, modules, and examples described herein.

As further illustrated in FIG. 17, the example system 1700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1702 may assume a variety of different configurations, such as for computer 1716, mobile 1718, and television 1720 uses. Each of these configurations includes devices that may have generally different constructs and capabilities, and thus the computing device 1702 may be configured according to one or more of the different device classes. For instance, the computing device 1702 may be implemented as the computer 1716 class of a device that includes a personal computer, desktop computer, a multi-screen computer, laptop computer, netbook, and so on.

The computing device 1702 may also be implemented as the mobile 1718 class of device that includes mobile devices, such as a mobile phone, portable music player, portable gaming device, a tablet computer, a multi-screen computer, and so on. The computing device 1702 may also be implemented as the television 1720 class of device that includes devices having or connected to generally larger screens in casual viewing environments. These devices include televisions, set-top boxes, gaming consoles, and so on.

The techniques described herein may be supported by these various configurations of the computing device 1702 and are not limited to the specific examples of the techniques described herein. This functionality may also be implemented all or in part through use of a distributed system, such as over a "cloud" 1722 via a platform 1724 as described below.

The cloud 1722 includes and/or is representative of a platform 1724 for resources 1726. The platform 1724 abstracts underlying functionality of hardware (e.g., servers) and software resources of the cloud 1722. The resources 1726 may include applications and/or data that can be utilized while computer processing is executed on servers that are remote from the computing device 1702. Resources 1726 can also include services provided over the Internet and/or through a subscriber network, such as a cellular or Wi-Fi network.

The platform 1724 may abstract resources and functions to connect the computing device 1702 with other computing devices. The platform 1724 may also serve to abstract scaling of resources to provide a corresponding level of scale to encountered demand for the resources 1726 that are implemented via the platform 1724. Accordingly, in an interconnected device embodiment, implementation of functionality described herein may be distributed throughout the system 1700. For example, the functionality may be implemented in part on the computing device 1702 as well as via the platform 1724 that abstracts the functionality of the cloud 1722.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining an indication of a target set of audio samples to be expanded;
   identifying one audio sample of multiple audio samples having a high compatibility rating with the target set, the high compatibility rating having been determined based on rhythmic compatibility of the one audio sample and the target set as well as harmonic compatibility of the one audio sample and the target set, each audio sample having corresponding audio sample metadata that identifies at least some of the parameters of the audio sample, and the target set of audio samples having corresponding audio sample metadata that identifies at least some of the parameters of the target set, the parameters of the target set comprising an aggregate of the metadata corresponding to each sample in the target set;
   automatically adding the one audio sample to the target set of audio samples; and
   updating the aggregate metadata for the target set to reflect the metadata of the added audio sample.

2. A method as recited in claim 1, the one audio sample having a high compatibility rating with the target set comprising one of the multiple audio samples having at least a threshold compatibility rating.

3. A method as recited in claim 1, the one audio sample having a high compatibility rating with the target set comprising one of the multiple audio samples having a highest compatibility rating.

4. A method as recited in claim 1, further comprising repeating the identifying and automatically adding until the target set includes a threshold number of samples.

5. A method as recited in claim 4, further comprising identifying a ratio of types of samples in the target set, and the identifying one audio sample and automatically adding comprising identifying and automatically adding to the target set audio samples having a high compatibility rating with the target set and maintaining the ratio of types of samples in the target set.

6. A method as recited in claim 1, further comprising determining the harmonic compatibility of the one audio sample and the target set using a pitch distribution of the one audio sample and a pitch distribution of the target set.

7. A method as recited in claim 1, further comprising:
determining a first score indicating the rhythmic compatibility of the one audio sample and the target set;
determining a second score indicating the harmonic compatibility of the one audio sample and the target set; and
generating the compatibility rating by combining the first score and the second score.

8. A method as recited in claim 1, further comprising generating the compatibility rating by combining one or more scores indicating:
instruments used in the audio sample and the target set;
genres of the audio sample and the target set;
a feel or rhythm pattern of the audio sample and the target set; and
moods of the audio sample and the target set.

9. A method as recited in claim 1, the high compatibility rating having been further determined based on types of instruments in the one audio sample and in the audio samples of the target set.

10. A method as recited in claim 1, the high compatibility rating having been further determined based on genres of the one audio sample and of the audio samples of the target set.

11. A method as recited in claim 1, the high compatibility rating having been further determined based on rhythm patterns of the one audio sample and of the audio samples of the target set.

12. A method as recited in claim 1, further comprising:
identifying one grouping of audio samples of multiple groupings of audio samples having a high compatibility rating with the target set, the high compatibility rating of the one grouping having been determined based on rhythmic compatibility of the one grouping and the target set as well as harmonic compatibility of the one grouping and the target set; and
automatically adding the one grouping of audio samples to the target set of audio samples.

13. A method as recited in claim 1, the automatically adding the one audio sample to the target set of audio samples comprising replacing a previous sample in the target set of audio samples with the one audio sample.

14. A computing device comprising:
a recommendation module configured to generate a compatibility rating for each of multiple groupings of audio samples, the compatibility rating of a grouping being based on rhythmic compatibility of the grouping and a target set of audio samples as well as harmonic compatibility of the grouping and the target set of audio samples, the grouping having rhythmic and harmonic content included in corresponding audio sample metadata, and the target set of audio samples having rhythmic and harmonic content included in corresponding aggregate metadata for the target set; and
an audio combining module configured to automatically add to the target set of audio samples one of the multiple groupings having a high compatibility rating, the audio combining module being further configured to update the aggregate metadata for the target set of audio samples to reflect the metadata of the added grouping.

15. A computing device as recited in claim 14, each of the multiple groupings comprising a set of samples having a particular theme.

16. A computing device as recited in claim 14, further comprising a module to determine the harmonic compatibility of the grouping and the target set using a pitch distribution of the grouping and a pitch distribution of the target set.

17. A computing device as recited in claim 14, the recommendation module being further configured to, for each of the multiple groupings of audio samples:
determine a first score indicating the rhythmic compatibility of the grouping and the target set;
determine a second score indicating the harmonic compatibility of the grouping and the target set; and
generate the compatibility rating for the grouping by combining the first score and the second score.

18. A computing device as recited in claim 14, the one of the multiple groupings having a high compatibility rating comprising one of the multiple groupings having at least a threshold compatibility rating.

19. A computing device comprising:
a recommendation module configured to generate a compatibility rating for each of multiple audio samples, the compatibility rating of an audio sample being based on rhythmic compatibility of the audio sample and a target set of audio samples as well as harmonic compatibility of the audio sample and the target set of audio samples, each audio sample having corresponding audio sample metadata that identifies at least some of the parameters of the audio sample, and the target set of audio samples having corresponding audio sample metadata that identifies at least some of the parameters of the target set, the parameters of the target set comprising an aggregate of the metadata corresponding to each sample in the target set; and
an audio combining module configured to automatically add to the target set of audio samples one of the multiple audio samples having a high compatibility rating, the one audio sample having a high compatibility rating with the target set comprising one of the multiple audio samples having at least a threshold compatibility rating, and repeatedly automatically add to the target set additional audio sample having a high compatibility rating until the target set includes a threshold number of samples, the audio combining module being further configured to update the aggregate metadata for the target set of audio samples to reflect the metadata of the added audio sample.

20. A computing device as recited in claim 19, the audio combining module being further configured to repeatedly automatically add to the target set of audio sample one of the multiple audio samples until the target set includes a threshold number of samples.

* * * * *